US006701757B1

(12) United States Patent
Vito

(10) Patent No.: US 6,701,757 B1
(45) Date of Patent: Mar. 9, 2004

(54) ACCESSORY COMPONENT FOR A LOCK

(76) Inventor: Robert A. Vito, 1434 Sugartown Rd., Berwyn, PA (US) 19312

( * ) Notice: Subject to any disclaimer, the term of this patent is extended or adjusted under 35 U.S.C. 154(b) by 0 days.

(21) Appl. No.: 10/285,002

(22) Filed: Oct. 31, 2002

Related U.S. Application Data

(63) Continuation-in-part of application No. 29/169,664, filed on Oct. 23, 2002, and a continuation-in-part of application No. 29/169,013, filed on Oct. 11, 2002.

(51) Int. Cl.[7] ............................................. E05B 67/00
(52) U.S. Cl. ........................ 70/51; 70/18; 70/53; 70/233
(58) Field of Search ................ 70/14, 58, 18, 70/39, 53, 55, 51, 233

(56) References Cited

U.S. PATENT DOCUMENTS

| | | | | |
|---|---|---|---|---|
| 153,312 A | | 7/1874 | Broome et al. ................ | 70/16 |
| 1,337,568 A | | 4/1920 | Shannon et al. | |
| 1,477,777 A | * | 12/1923 | Shek ............................ | 70/18 |
| 1,503,210 A | | 7/1924 | Shannon | |
| 3,091,011 A | * | 5/1963 | Campbell .................... | 70/18 |
| 3,678,717 A | * | 7/1972 | Eaton ......................... | 70/232 |
| 3,754,418 A | | 8/1973 | Miller ......................... | 70/18 |
| 3,754,420 A | | 8/1973 | Oellerich .................... | 70/58 |
| 3,800,570 A | | 4/1974 | Kaplan ....................... | 70/18 |
| 3,838,585 A | * | 10/1974 | Foote ......................... | 70/18 |
| 3,924,426 A | | 12/1975 | Zane et al. ................... | 70/18 |
| 3,959,995 A | * | 6/1976 | Fletcher ...................... | 70/18 |
| 4,155,231 A | | 5/1979 | Zane et al. ................... | 70/18 |
| 4,719,773 A | * | 1/1988 | Alberts ....................... | 70/18 |
| 4,736,921 A | | 4/1988 | Zane et al. .............. | 248/316.2 |
| 4,850,207 A | * | 7/1989 | Ylven ......................... | 70/49 |
| 4,896,519 A | * | 1/1990 | Pitts ........................... | 70/58 |
| 5,010,746 A | | 4/1991 | Zane et al. ................... | 70/39 |
| 5,092,142 A | | 3/1992 | Zane et al. ................... | 70/39 |
| 5,133,568 A | * | 7/1992 | Balterman ................ | 224/30 A |
| 5,440,904 A | * | 8/1995 | Su ............................... | 70/18 |
| 5,505,064 A | * | 4/1996 | Wang .......................... | 70/53 |
| 5,647,520 A | | 7/1997 | McDaid .................... | 224/425 |
| 5,675,999 A | * | 10/1997 | Carlstrom .................. | 70/18 |
| 5,706,679 A | | 1/1998 | Zane et al. ................... | 70/18 |
| 5,794,462 A | | 8/1998 | Steele et al. ................ | 70/18 |
| 5,901,588 A | * | 5/1999 | Frost .......................... | 70/39 |
| 5,937,678 A | * | 8/1999 | Kuo ............................ | 70/18 |
| 6,006,555 A | * | 12/1999 | Shu-Fen ...................... | 70/18 |
| 6,109,074 A | * | 8/2000 | Du .............................. | 70/18 |
| 6,192,720 B1 | * | 2/2001 | Kan ............................ | 70/49 |
| 6,263,709 B1 | * | 7/2001 | Kemery et al. ............. | 70/14 |
| 6,321,961 B1 | | 11/2001 | McDaid et al. ........... | 224/442 |
| 6,422,442 B1 | | 7/2002 | McDaid et al. ........... | 224/441 |
| 6,430,973 B1 | * | 8/2002 | Huang ........................ | 70/18 |
| 6,467,315 B1 | * | 10/2002 | Edmondson ................ | 70/14 |

\* cited by examiner

*Primary Examiner*—Suzanne Dino Barrett
(74) *Attorney, Agent, or Firm*—Volpe and Koenig, P.C.

(57) ABSTRACT

An accessory component for a lock having a lock body capable of being detachably secured in closed loop to define a first bounded area. The accessory component includes a component body having first and second ends. The first end includes a first ring defining a first bore and second end includes a second ring defining a second bore. The accessory component is adapted to be positionable in an installed configuration in which the at least a portion of the lock body is located within the first and second bores such that the accessory component, in combination with the lock body, defines a second bounded area. The accessory component is adapted to secure an object within the second bounded area when the accessory component is in the installed configuration and the lock is detachably secured to form the closed loop.

16 Claims, 16 Drawing Sheets

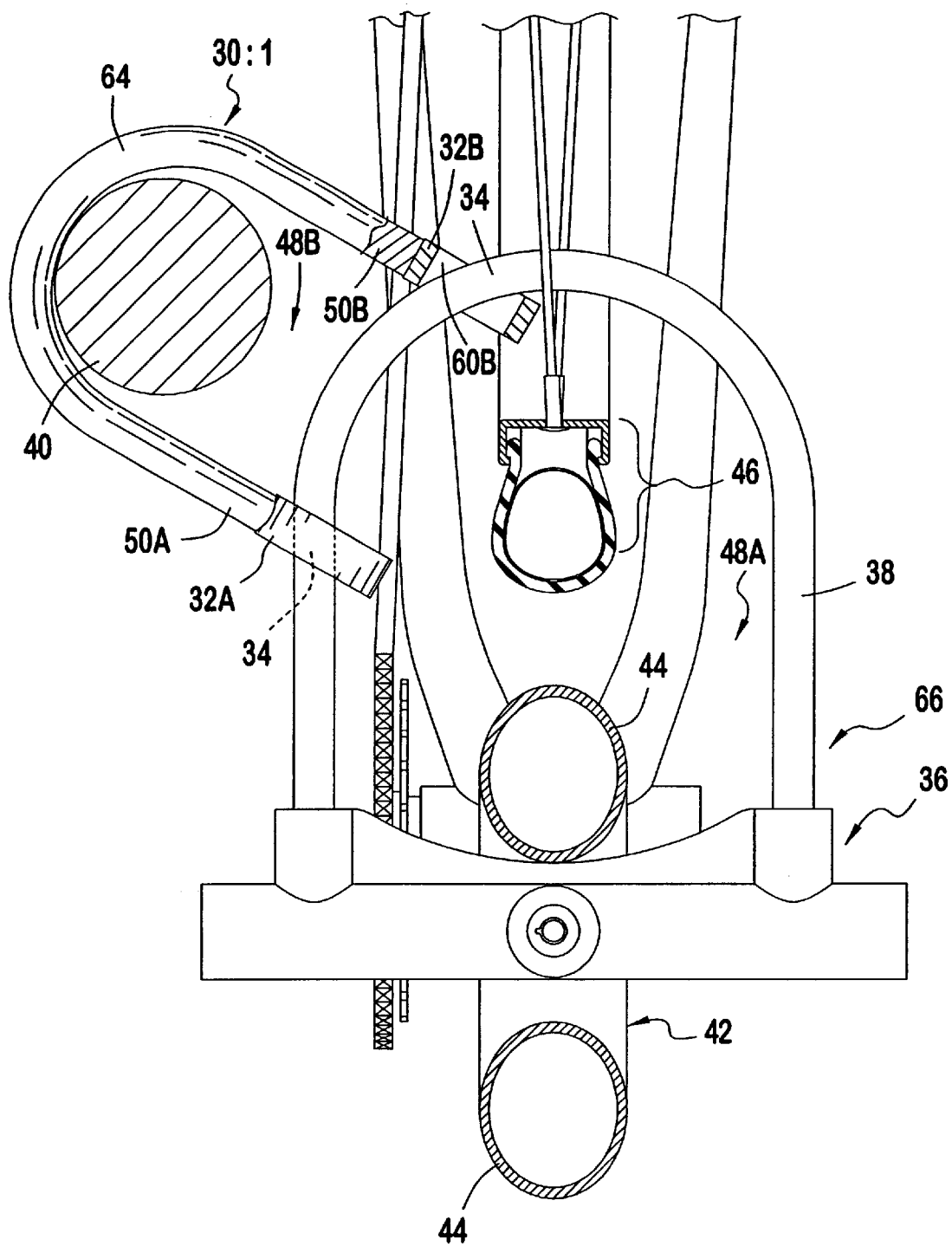

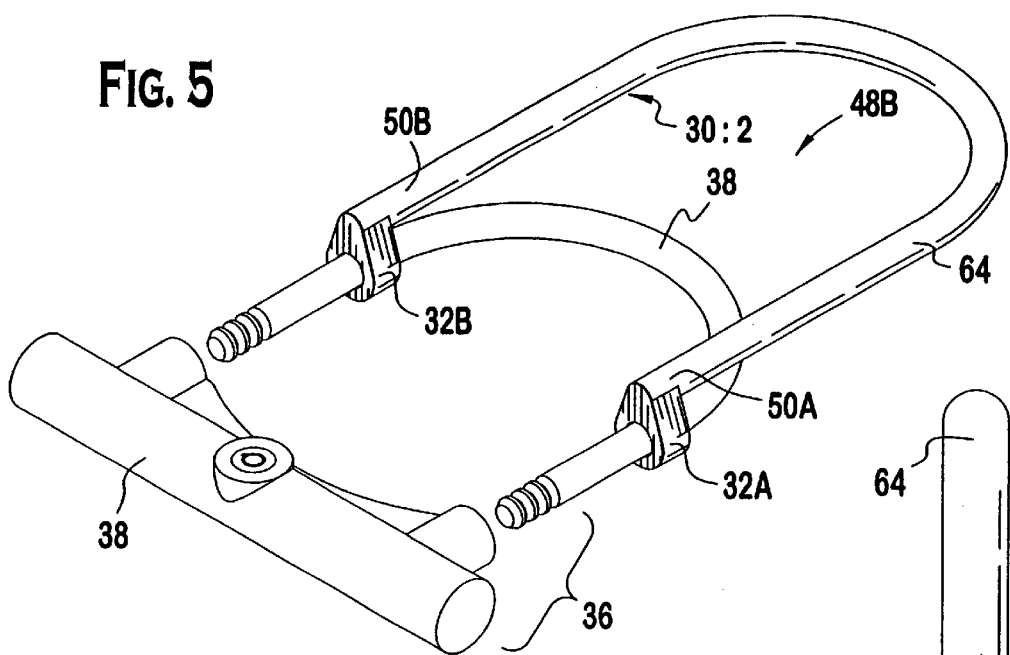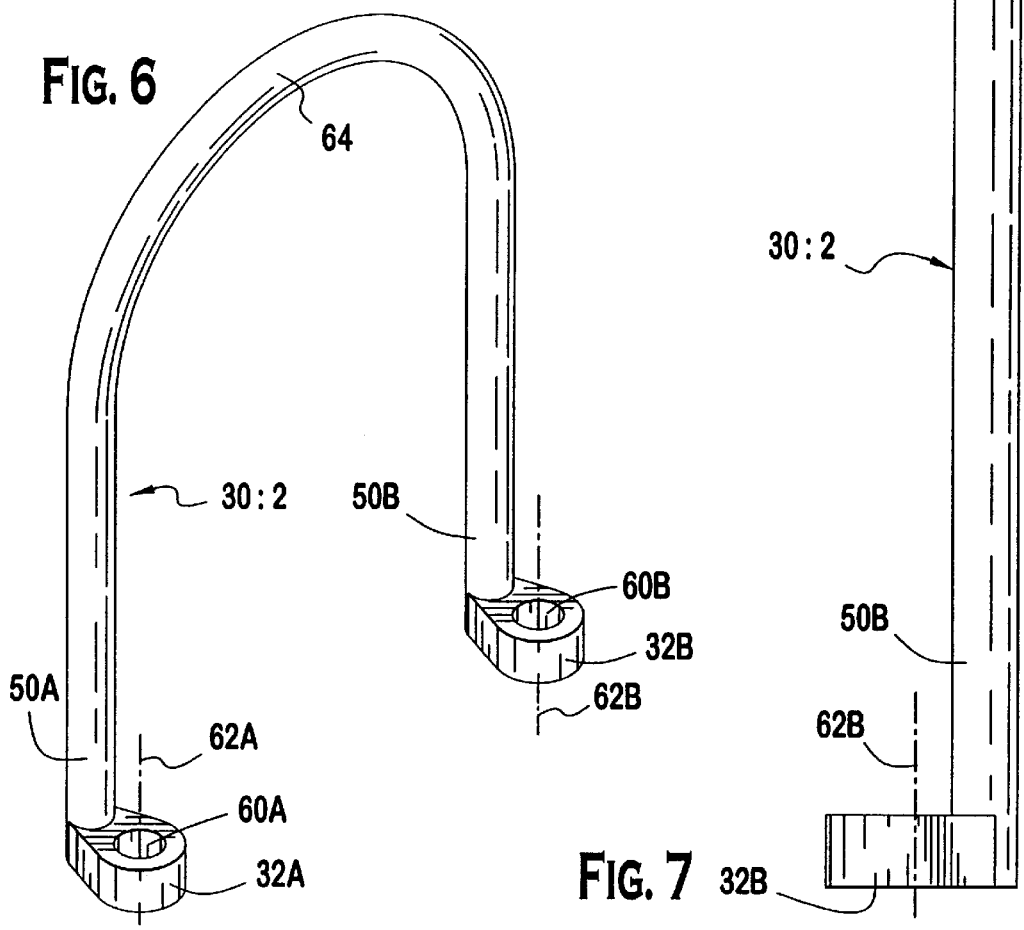

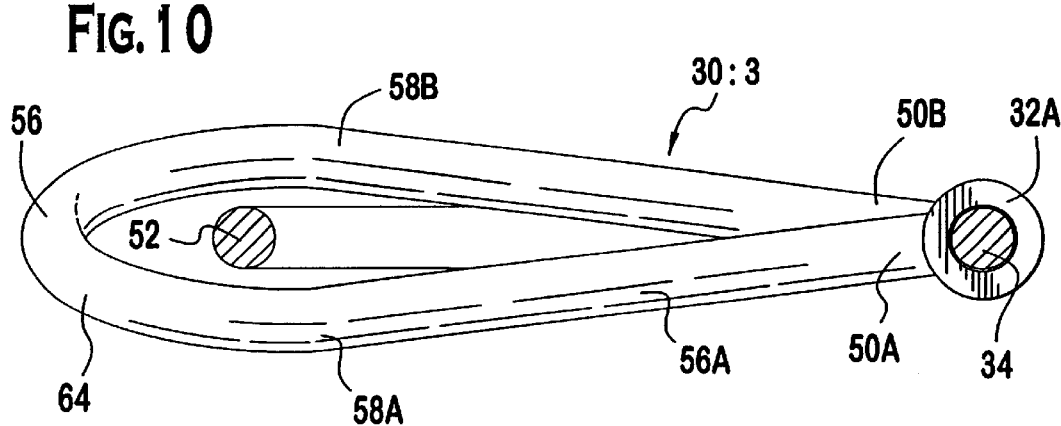
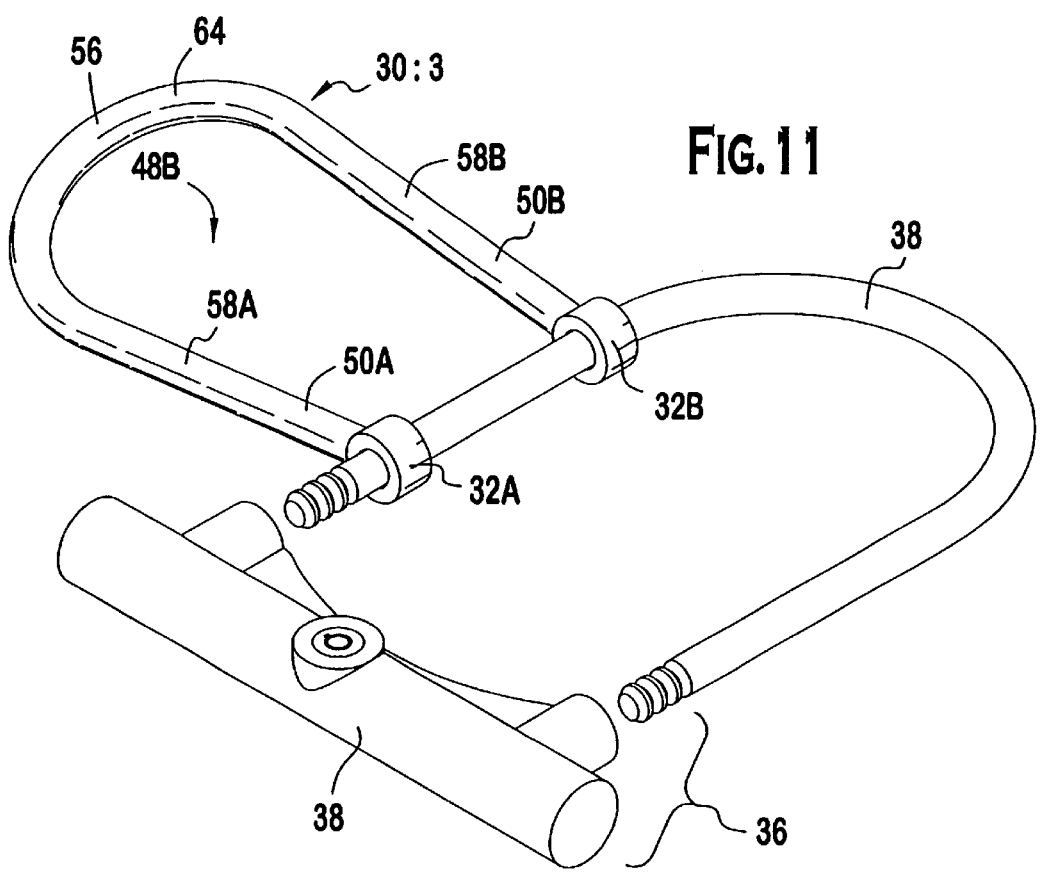

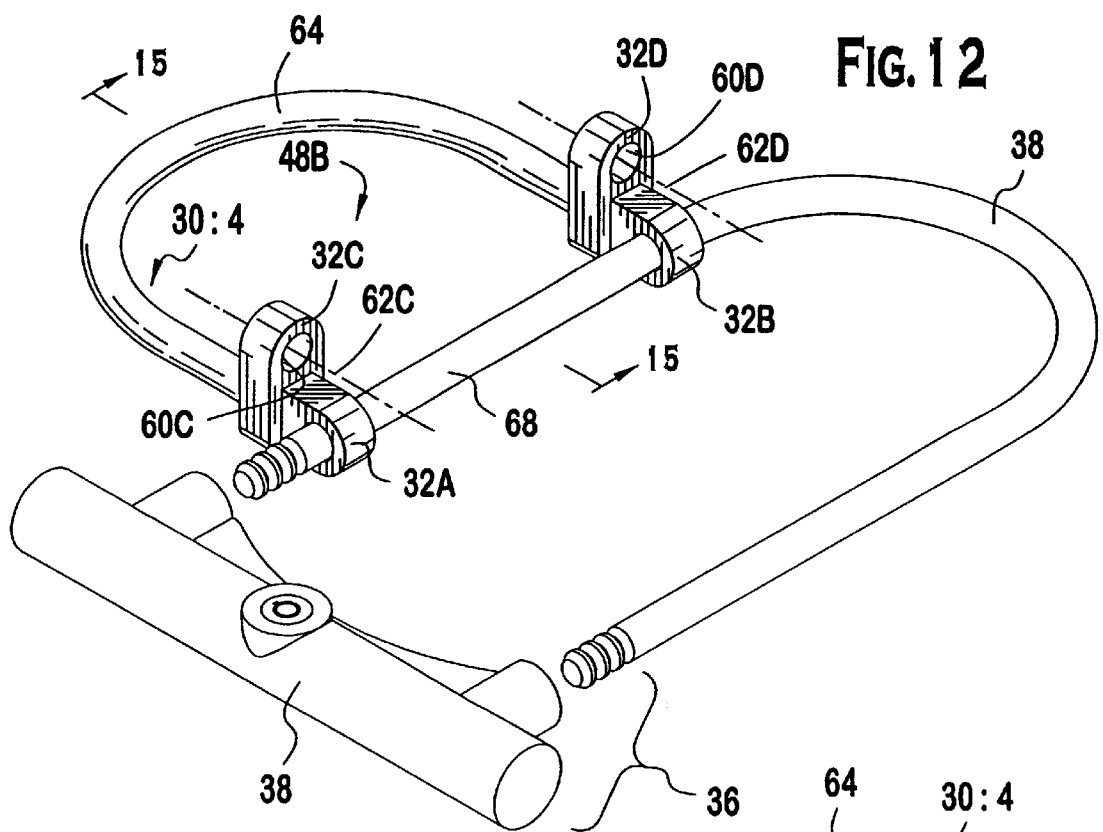
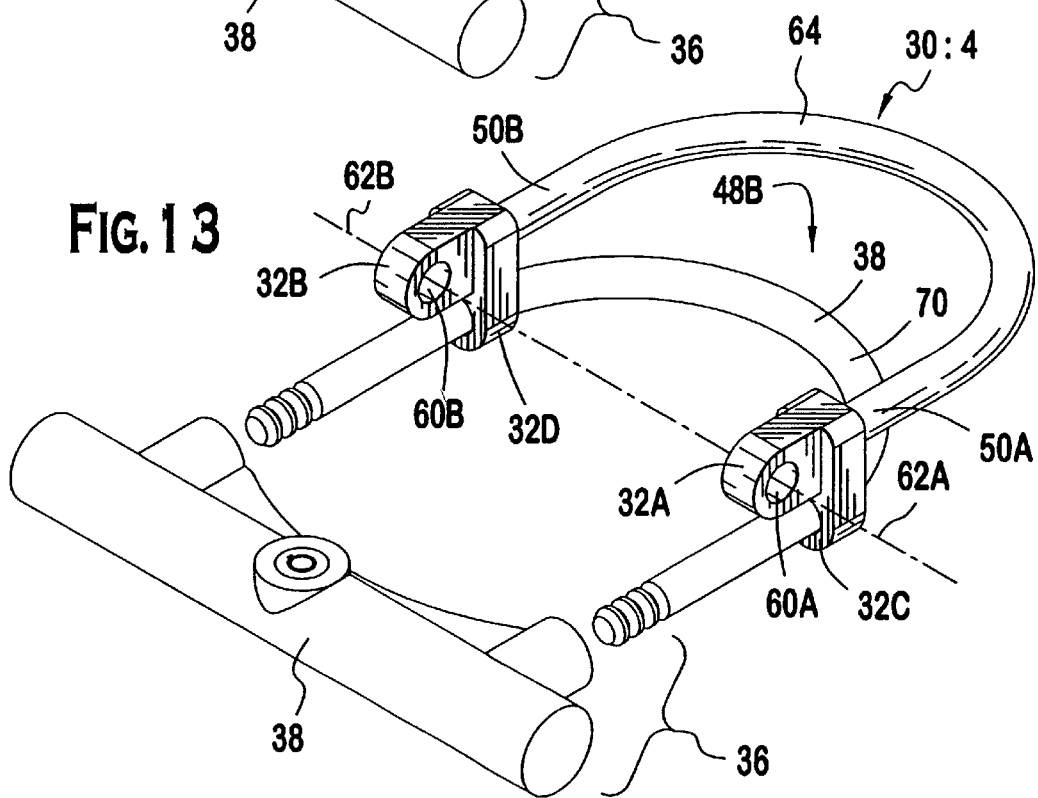

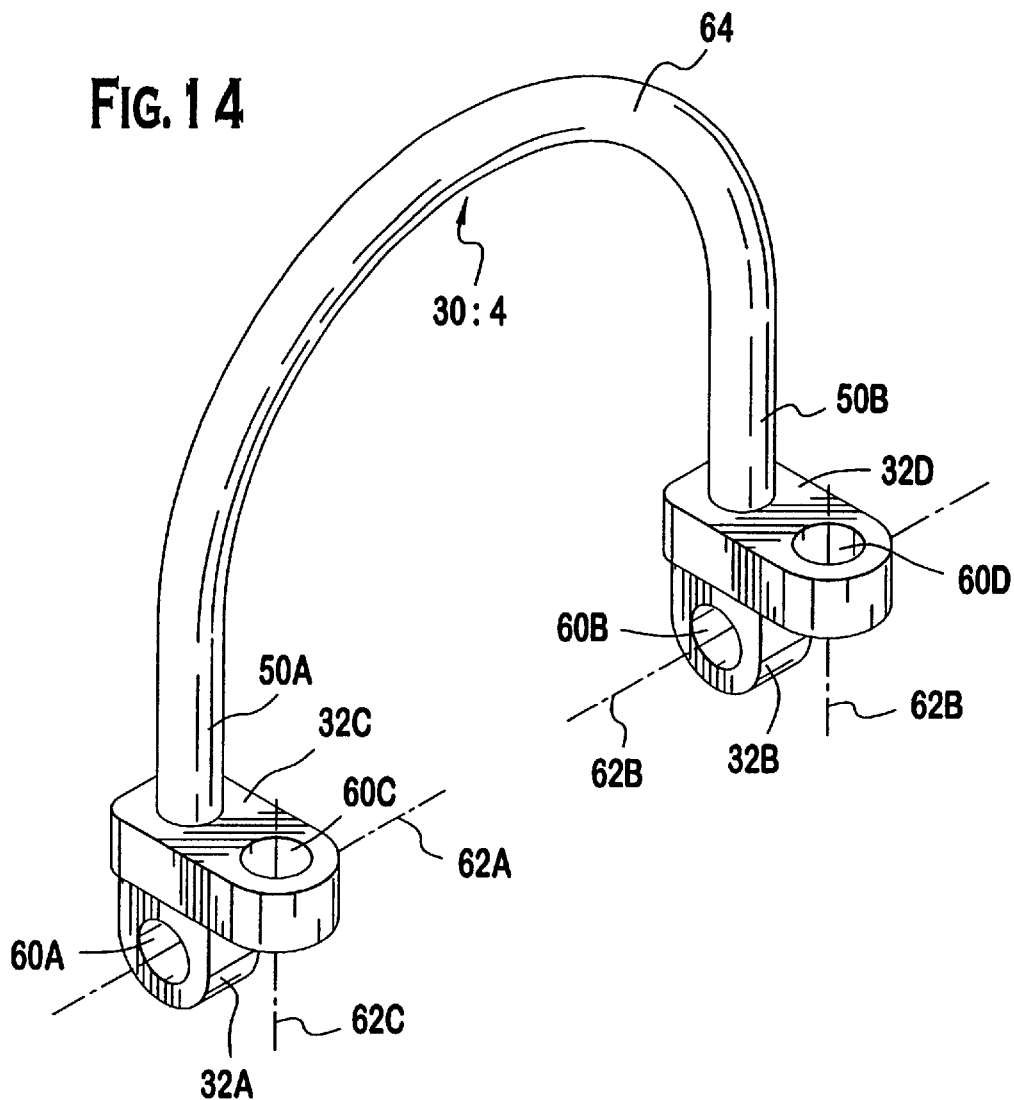
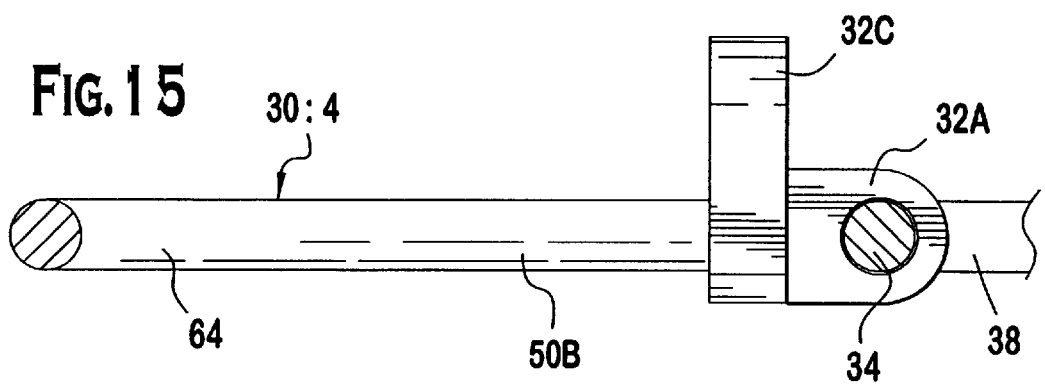

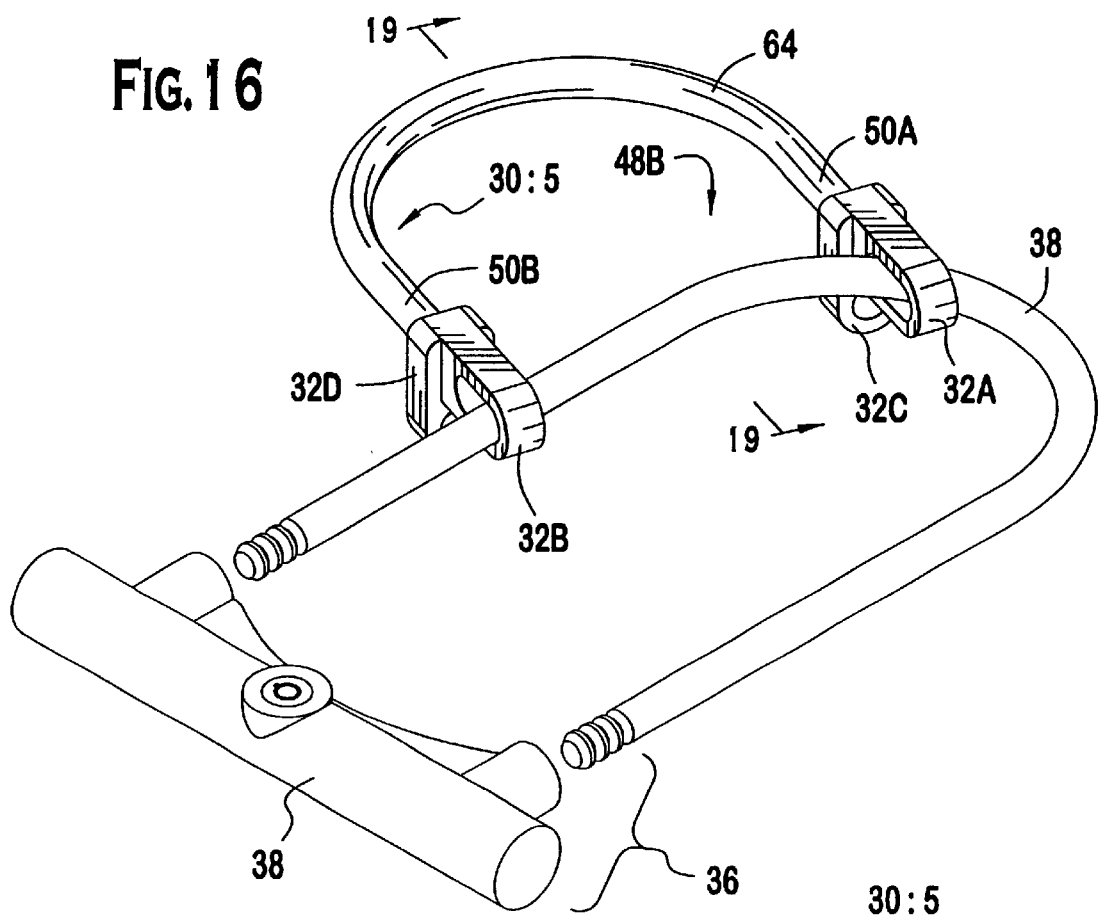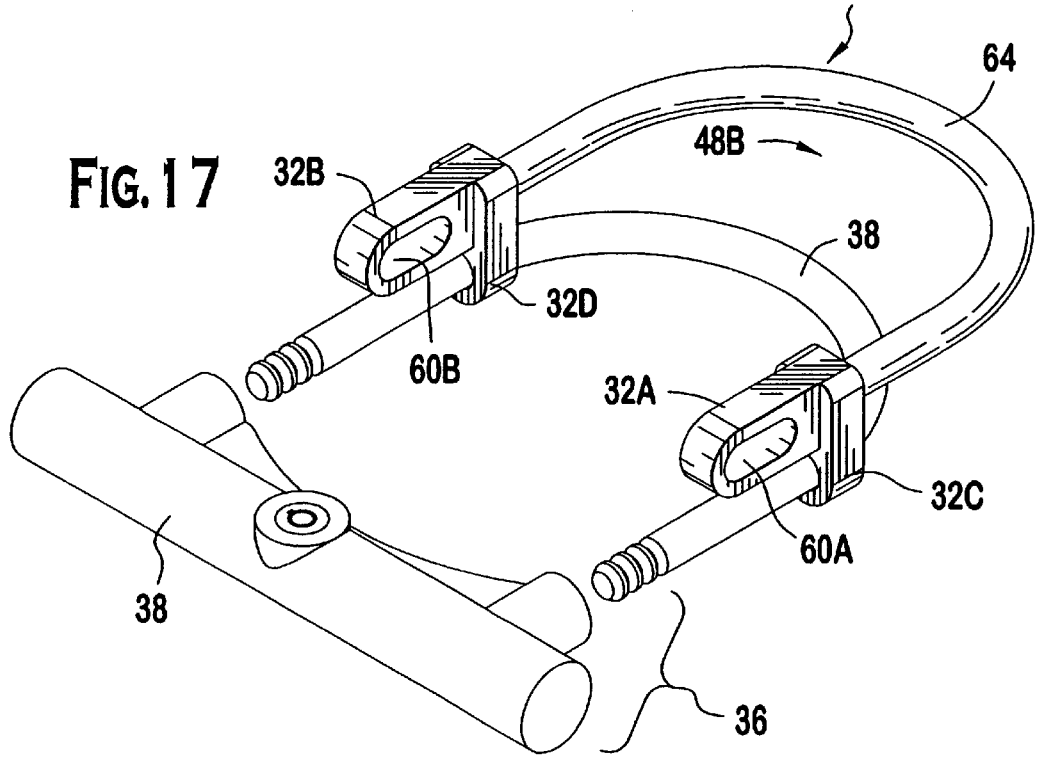

ACCESSORY COMPONENT FOR A LOCK

CROSS REFERENCE TO RELATED APPLICATIONS

This application claims priority from and is a continuation-in-part of U.S. Design patent application Ser. No. 29/169,013, filed Oct. 11, 2002, entitled "Lock Assembly Component"; and a continuation-in-part of U.S. Design patent application Ser. No. 29/169,013 entitled "Lock Assembly Component", filed Oct. 23, 2002, invented Mr. Robert A. Vito, both of the above-identified priority applications are hereby incorporated by reference herein as if fully set forth in their entirety.

BACKGROUND

The present invention is directed to lock assemblies and, more specifically, to an accessory component for a lock.

In the past, people concerned with locking their possessions to a fixed object typically used a chain or cable that was interwoven around the possession and the fixed object, such as lamp post. While the use of chains, cables or other flexible locking mechanisms provided a locking device that could sometimes be compactly stored, such devices are relatively simple to disable using bolt cutters or the like.

In response to the ineffectiveness of cable and chains for securing one's belongings, rigid U-shaped locks were developed, typically for use with bicycles. These U-shaped locks were typically formed by a U-shaped shackle having two legs with both ends joined by a crossbar. These locks were difficult to store because the device was not compactable. Additionally, users must decide at the time of purchase what would be an appropriately sized U-shaped lock would be. This required that the user to make an unpleasant, and possibly erroneous choices.

A user could select a relatively small U-shaped lock which may not be suitable for all applications (due to the relatively limited size of the area bounded by the U-shaped lock) or the user could elect to purchase a relatively larger U-shaped lock which would be significantly more difficult to store and transport.

Clearly, what is needed is an accessory component that is usable with both flexible locking mechanisms and rigid locking mechanisms, that allows a user to form a second bounded area in which an object can be enclosed, and that is relatively easy to store and transport.

SUMMARY

One embodiment of the present invention is directed to an accessory component for a lock having a lock body capable of being detachably secured in closed loop to define a first bounded area. The accessory component includes a component body having first and second ends. The first end includes a first ring defining a first bore and second end includes a second ring defining a second bore. The first and a second bores are adapted to receive at least a portion of the lock body therein. The accessory component is adapted to be positionable in an installed configuration in which the at least a portion of the lock body is located within the first and second bores such that the accessory component, in combination with the lock body, defines a second bounded area. The accessory component is adapted to secure an object within the second bounded area when the accessory component is in the installed configuration and the lock is detachably secured to form the closed loop.

A separate embodiment of the present invention is directed to a lock system including a lock having a lock body capable of being detachably secured in a closed loop to define a first bounded area. An accessory component includes a component body having first and second ends. The first end includes a first ring defining a first bore and the second end includes a second ring defining a second bore. The first and second bores receive at least a portion of the lock body therein. The accessory component is positionable in an installed configuration in which the at least a portion of the lock body is located within the first and second bores such that the accessory component, in combination with the lock body, defines a second bounded area. The accessory component is adapted to secure an object within the second bounded area when the accessory component is in the installed configuration and the lock is detachably secured to form the closed loop.

A separate embodiment of the present invention is directed to a method of securing a first object to a second object. The method includes; providing a lock having a lock body; providing an accessory component having a component body having first and seconds ends, the first end including a first ring defining a first bore and second end including a second ring defining a second bore; positioning the lock around and/or through at least a portion of the first object; positioning the accessory component around and/or through at least a portion of the second object; inserting a portion of the lock through the first and second bores; and detachably securing the lock in a closed loop to define a bounded area securing at least a portion of the first object therein, wherein the accessory component, in combination the lock, defines a second bounded area securing at least a portion of the second object therein.

A separate embodiment of the present invention is directed to a lock system including a lock having a lock body capable of being detachably secured in closed loop to define a first bounded area. An accessory component includes a component body having first and second ends. The first end includes a first ring defining a first bore and the second end includes a second ring defining a second bore. The first and second bores receive at least a portion of the lock body therein. The accessory component is positionable in an installed configuration in which the least a portion of the lock body is located within the first and second bores such that the accessory component, in combination with the lock body, defines a second bounded area. The accessory component is adapted to secure an object within the second bounded area when the accessory component is in the installed configuration and the lock is detachably secured to form the closed loop. The component body includes a portion forming a component body end and first and second component body legs extending from the component body end. The component body end is located generally opposite from the first and second rings. The component body is configured to define a twist such that the component body receives a second portion of the lock body, that is generally parallel to and spaced from the at least a portion of the lock body located within the first and second bores, therethrough with the second portion of the lock body being bordered on at least two sides by the component body end and the first and second component body legs.

A separate embodiment of the present invention is directed to an accessory component for a lock having a lock body capable of being detachably secured in a closed loop to define a first bounded area. The accessory component includes a component body having first and second ends. The first end includes a first ring defining a first bore and the second end includes a second ring defining a second bore. The first and second bores are adapted receive at least a portion of the lock therein. The accessory component is adapted to be positionable in an installed configuration in which the at least a portion of the lock body is located within the first and second bores such that the accessory component, in combination with the lock body, defines a second bounded area. The accessory component is adapted to secure an object within the second bounded area when the accessory component is in the installed configuration and the lock is detachably secured to form the closed loop. The component body includes a portion forming a component end and first and second component body legs extending from the component body end. The component body end is located generally opposite from the first and second rings. The component body is configured to define a twist such that the component body is adapted to receive a second portion of the lock body, that is oriented generally parallel and spaced from the at least a portion of the lock body when the at least a portion of the lock is located within the first and second bores, therethrough with the second portion of the lock body being bordered on at least two sides by the component body end and the first and second component body legs.

BRIEF DESCRIPTION OF THE DRAWINGS

The foregoing summary, as well as the following detailed description of the preferred embodiments of the present invention, will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIG. 4 is a schematic, partial cross-sectional view of the accessory component of FIG. 1 in the installed configuration on a lock. The lock is detachably secured through a bicycle to define a first bounded area enclosing a portion of the bicycle frame and a rear tire of the bicycle. The accessory component defines a second bounded area enclosing an object, such as a lamp post or bicycle stand;

FIG. 5 is a perspective view of a second preferred embodiment of the accessory component of the present invention illustrating a portion of the lock body extending between the first and second rings of the accessory components;

FIG. 6 is a second perspective view of the accessory component of FIG. 5;

FIG. 7 is a side elevational view of the accessory component of FIG. 5;

FIG. 10 is a side elevational view of the accessory component of FIG. 8 illustrating the at least a portion of the lock body within the first ring and illustrating the second portion of the lock body bounded above and below by the first and second component body legs;

FIG. 11 is a perspective of the accessory component of FIG. 8 attached to at least a portion of the lock body to define the second bounded area;

FIG. 12 is a perspective view of an accessory component according to a fourth preferred embodiment of the present invention and illustrates the accessory component secured to at least a portion of the lock body to define the second bounded area;

FIG. 13 is a perspective view of the accessory component of FIG. 12 illustrating the accessory component attached to at least a portion of the lock body via third and fourth rings to define the second bounded area;

FIG. 14 is a perspective view of the accessory component of FIG. 12;

FIG. 15 is a cross-sectional view of the accessory component of FIG. 12 as taken along the line 15—15 of FIG. 12;

FIG. 16 is a perspective view of an accessory component according to a fifth preferred embodiment of the present invention illustrating the accessory component with first and second rings engaged with at least a portion of the lock body to define the second bounded area;

FIG. 17 is a perspective view of the assembly component of FIG. 16 illustrating the accessory component engaged with at least a portion of the lock body via third and fourth rings to define the second bounded area;

DETAILED DESCRIPTION OF THE PREFERRED EMBODIMENTS

Figure 1:
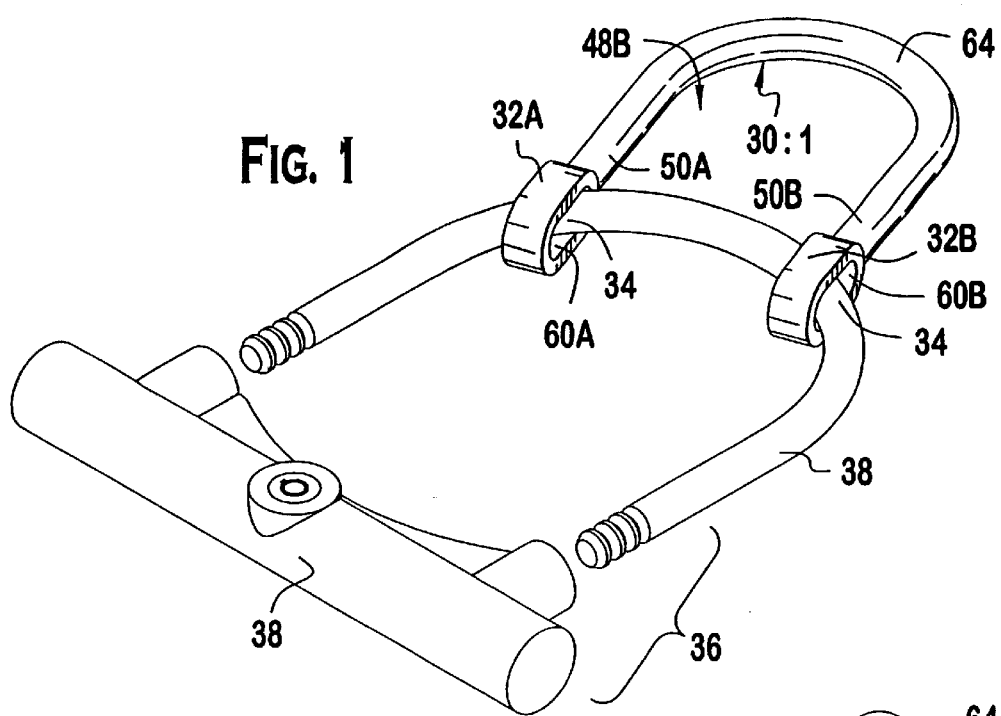
FIG. 1 is a perspective view of an accessory component according to a first preferred embodiment of the present invention with first and second rings engaged with at least a portion of a lock body.

Certain terminology is used in the following description for convenience only and is not limiting. The words "right," "left," "top," and "bottom" designate directions in the drawings to which reference is made. The words "inwardly" and "outwardly" refer to directions toward and away from, respectively, the geometric center of the accessory component and designated parts thereof. This terminology includes the words above specifically mentioned, derivatives thereof, and words of similar import. Additionally, the words "a" and "one" are defined as including one or more of the referenced item unless specifically stated otherwise.

Referring to FIGS. 1–29, wherein like numerals indicate like elements throughout, seven preferred embodiments of an accessory component are shown and designated 30:1–30:7, respectively. Briefly stated, the accessory component 30:1–30:7 can be used to define a second bounded area 48B in addition to a first bounded area 48A formed by a lock 36. By allowing a second bounded area 48B to be secured, the accessory component 30:1–30:7 allows an increase in the bounded area provided by the lock 36 to facilitate the securing of first and second objects together.

It is preferred that the accessory component 30:1–30:7, and its individual components, are formed of high strength, rigid, impact resistant material, such as hardened steel. Those of ordinary skill in the art will appreciate from this disclosure, that any suitable metals, steels, alloys or the like can be used to form the accessory component 30:1–30:7 without departing from the present invention. Preferably, an outer surface of the accessory component 30:1–30:7 is coated with a paint or vinyl coating so that the accessory component 30:1–30:7 is visually pleasing.

Referring to FIGS. 1–4B, a first preferred embodiment of the accessory component 30:1 is shown. The accessory component is preferably used with a lock 36 having a lock body 38 capable of being detachably secured in a closed loop to define a first bounded area 48A. The lock 36 is preferably a rigid lock. However, those of ordinary skill in the art will appreciate from this disclosure that flexible chain and cable locks or the like can be used with the accessory component 30:1–30:7 without departing from the scope of the present invention. While the accessory component 30:1–30:7 is shown in combination with a U-shaped rigid lock 36, those of ordinary skill in the art will appreciate that from this disclosure any type of rigid lock can be used with the accessory component 30:1–30:7 without departing from the scope of the present invention.

Figure 2:
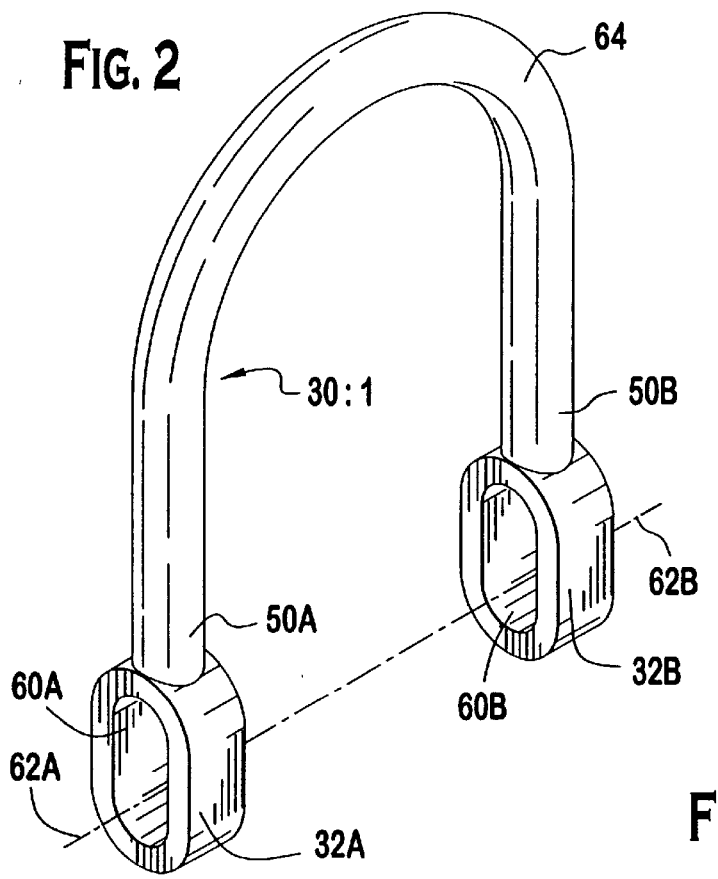
FIG. 2 is a second perspective view of the accessory component of FIG. 1.

The accessory component 30:1–30:7 includes a component body 64 having first and second ends 50A, 50B, respectively. Referring to FIGS. 2 and 4, the component body 64 preferably is generally U-shaped. Alternatively, the component body 64 may have a generally P-shaped body without departing from the scope of the present invention. Those of ordinary skill in the art will appreciate from this disclosure that the component body is not limited to any particular shape. For example, as shown in FIGS. 20–23, the component body 64 can be irregularly shaped without departing from the scope of the present invention. Additionally, while it is preferred that the component body 64 have a generally circular cross section, those of ordinary skill in the art will appreciate that the component body 64 can have any cross-section without departing from the scope of the present invention.

The first end 50A of the accessory component 30:1–30:7 includes a first ring 32A defining a first bore 60A. The second end 50B of the accessory component 30:1–30:7 includes a second ring 32b defining a second bore 60B. Referring to FIGS. 2 and 6, those of ordinary skill in the art will appreciate from this disclosure that the first and second rings 32A, 32B can be oriented in any direction without departing from the scope of the present invention. Additionally, those of ordinary skill in the art will appreciate that the particular shape of the first and second rings 32A, 32B and the corresponding bores 60A, 60B can vary without departing from the scope of the present invention.

Figure 8:
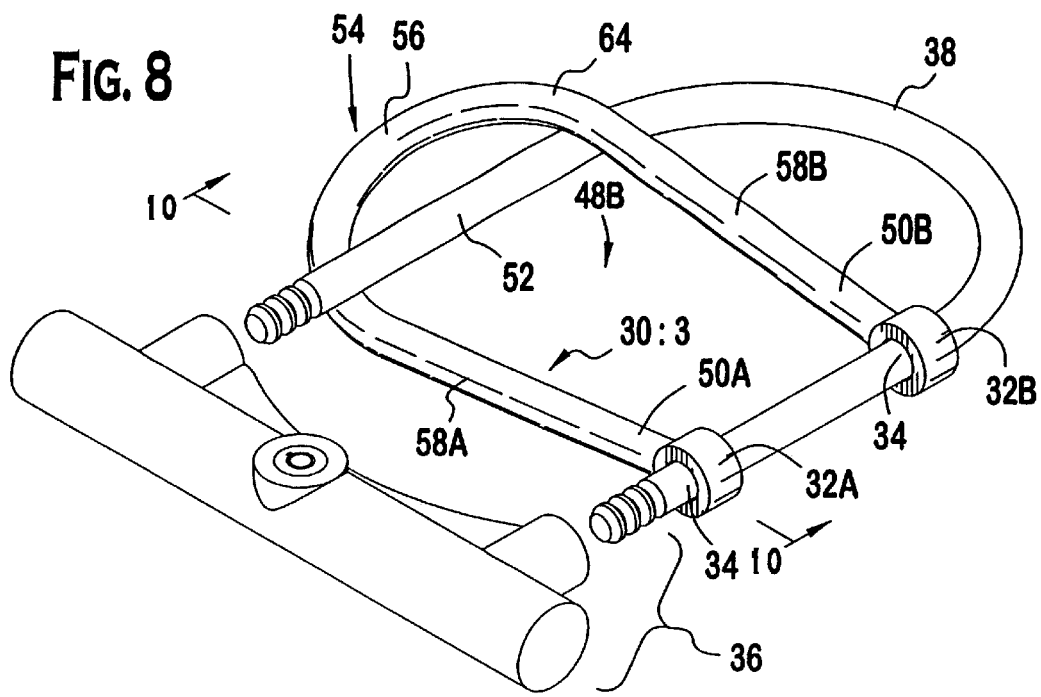
FIG. 8 is perspective view of a third preferred embodiment of the accessory component according to the present invention. The accessory component has a portion forming a component body end and first and second component body legs which extend from the component body end. The component body is configured to define a twist such that the component body receives a second portion of the lock body, that is generally parallel to and spaced from the at least a portion of the lock body located within the first and second bores, therethrough with the second portion of the lock body being bordered on at least two sides by the component body end and the first and second component body legs (as shown in FIG. 10)

The first and second bores 32A, 32B are adapted to receive at least a portion 34 of the lock body 38 therein. Referring to FIGS. 4, 5, and 8, the accessory component 30:1–30:7 can be positioned along any portion of the lock body 38 without departing from scope of the present invention.

Figure 9:
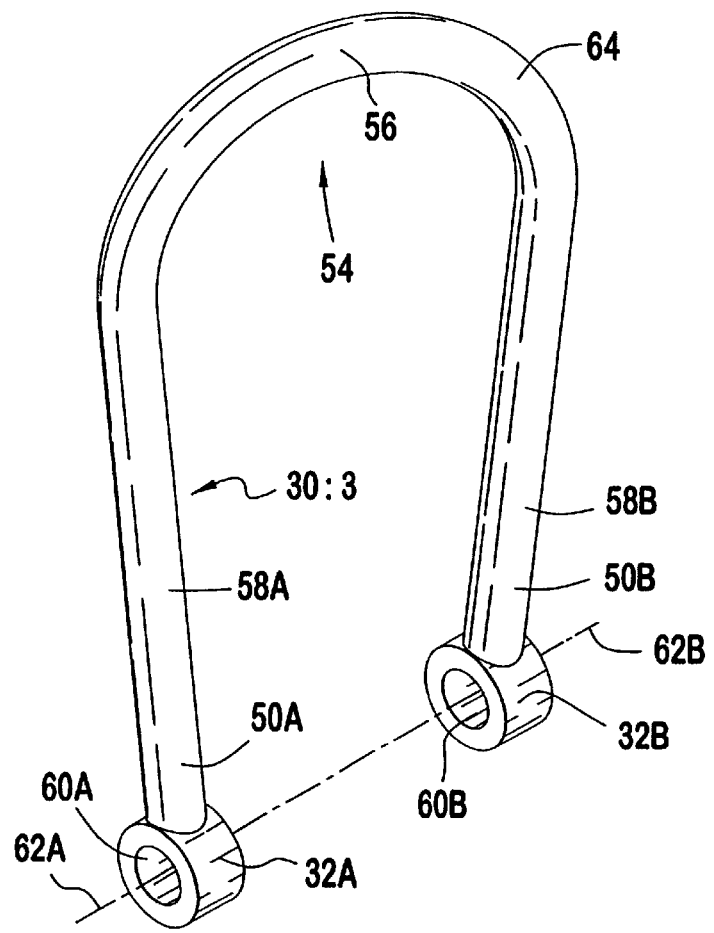
FIG. 9 is a second perspective view of the accessory component of FIG. 8.
Figure 18:
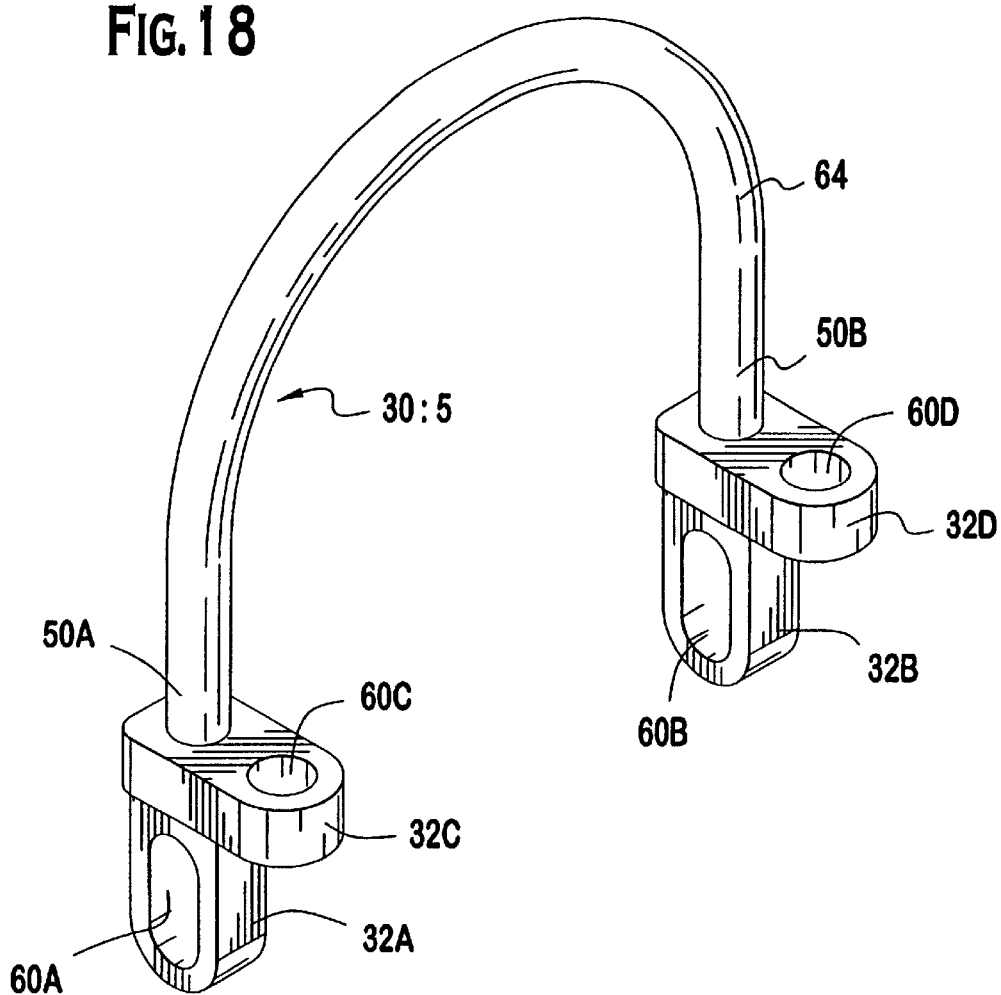
FIG. 18 is a perspective view of the accessory component of FIG. 16.
Figure 19:
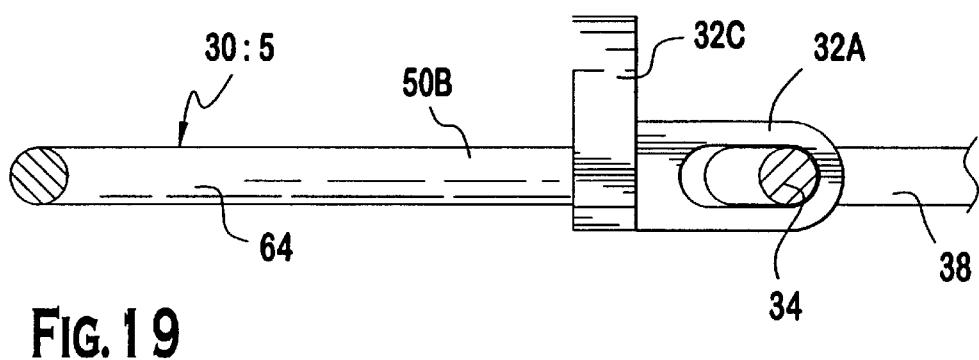
FIG. 19 is a cross-sectional view of the accessory component of FIG. 16 taken along the line 19—19 of FIG. 16.
Figure 20:
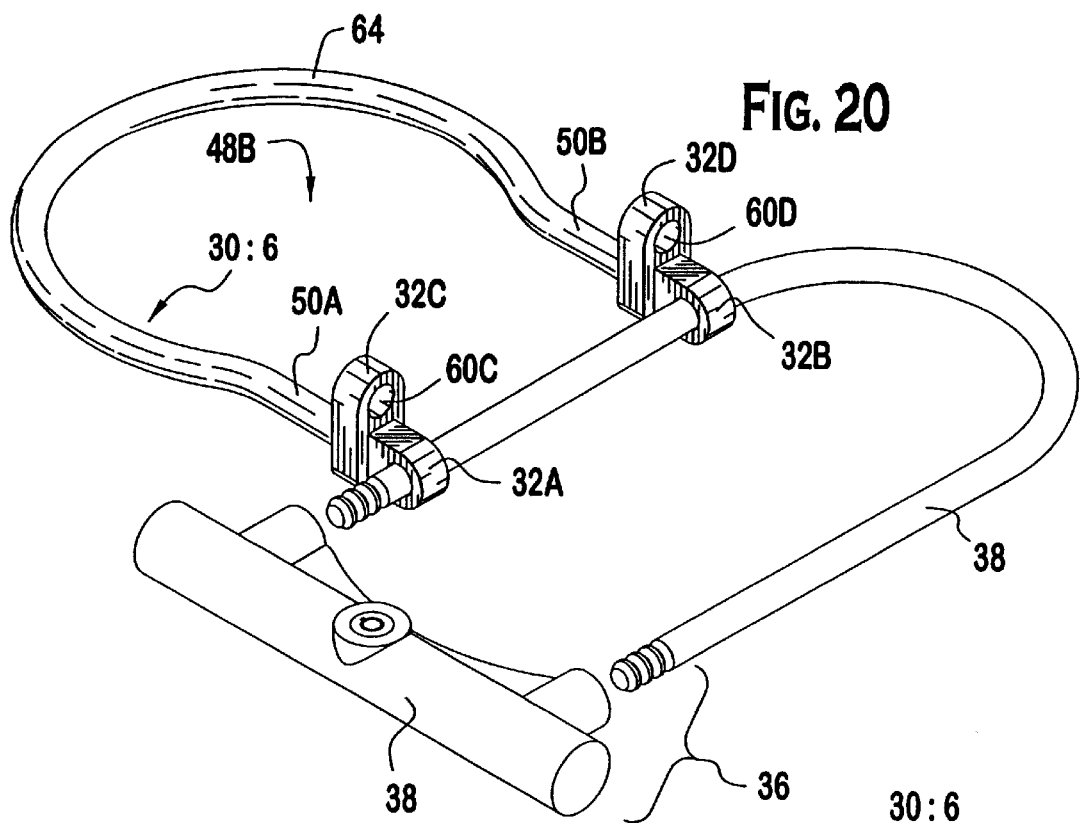
FIG. 20 is perspective view of an accessory component according to a sixth preferred embodiment of the present invention illustrating the first and second rings of the accessory component engaged with at least a portion of the lock body to define the second bounded area.
Figure 21:
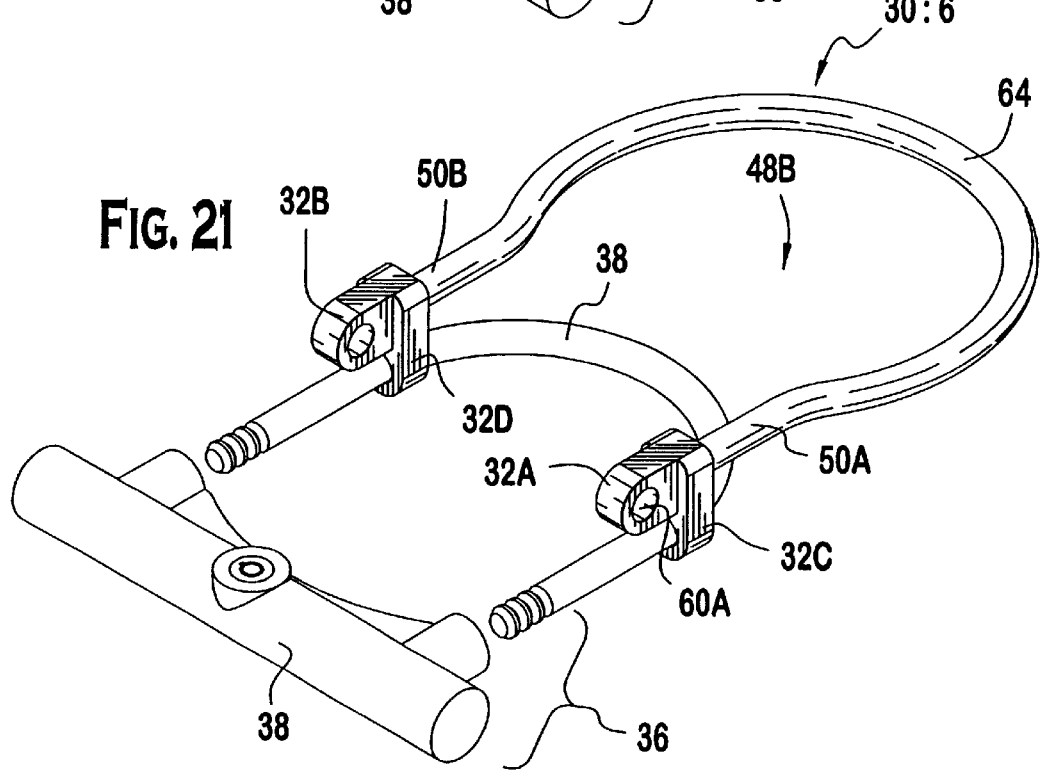
FIG. 21 is a perspective view of the accessory component of FIG. 20 engaged to the at least a portion of the lock body via third and fourth rings.
Figure 22:
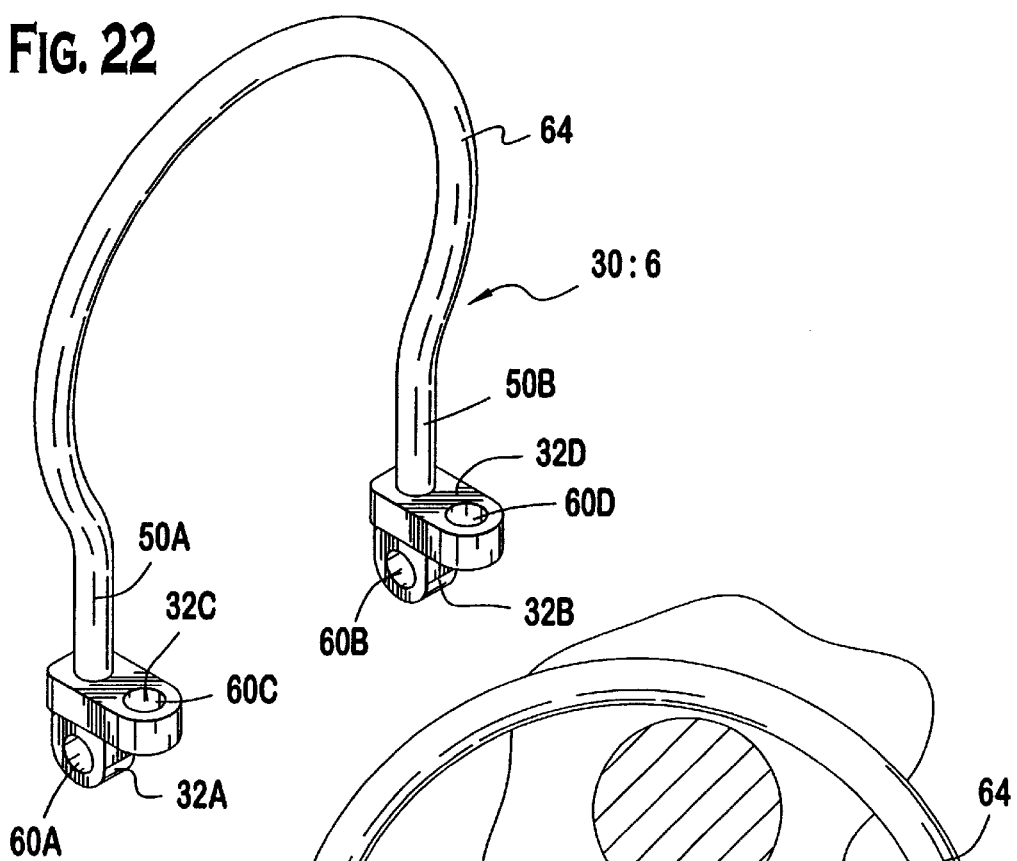
FIG. 22 is a perspective view of the accessory component of FIG. 20.
Figure 23:
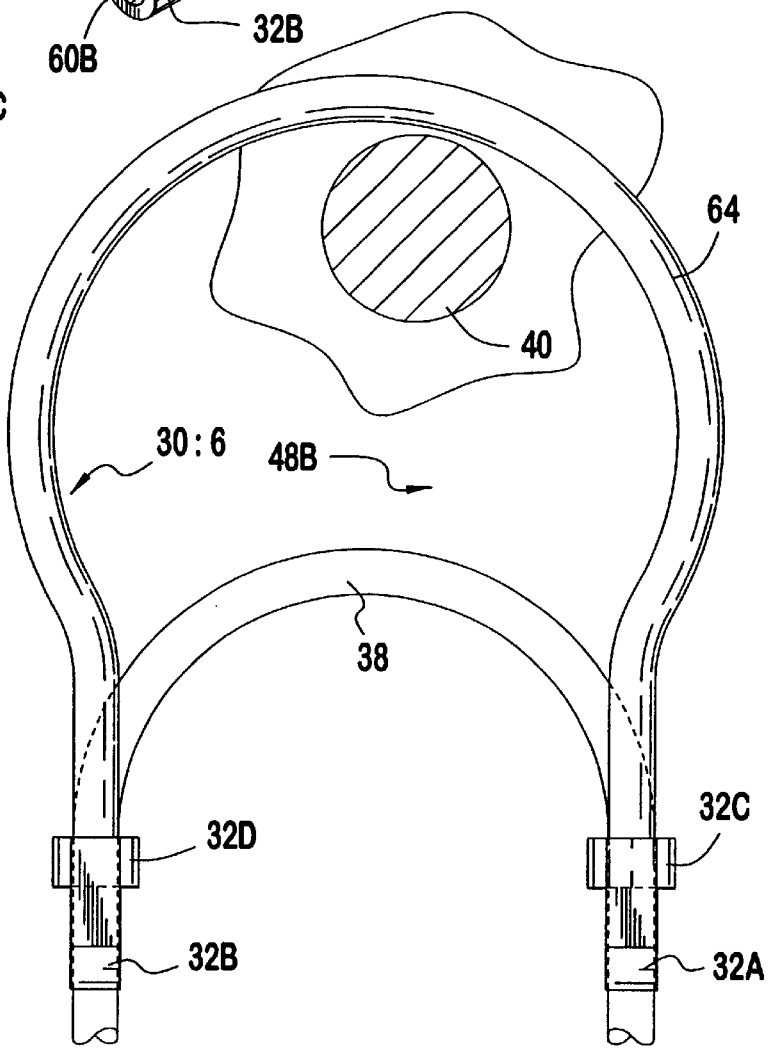
FIG. 23 is a plan view of the accessory component of FIG. 21 illustrating the second bounded area enclosing an object.
Figure 24:
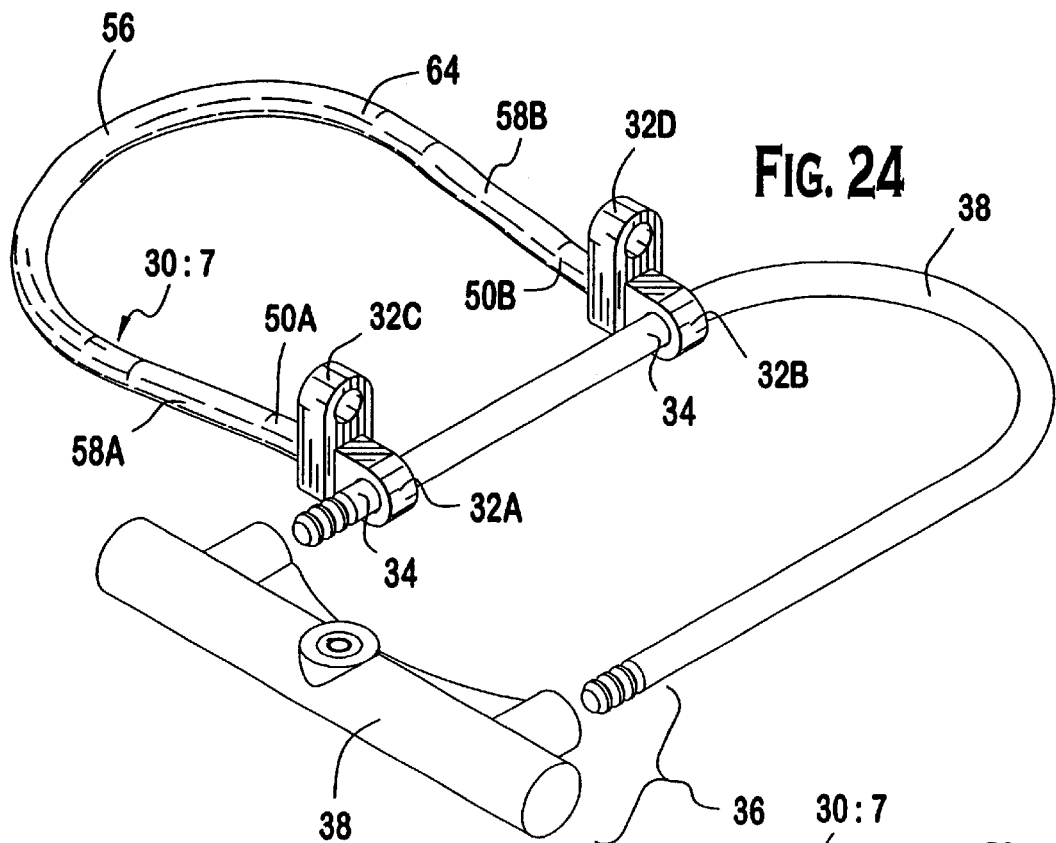
FIG. 24 is perspective view of an accessory component according to a seventh preferred embodiment of the present invention with first and second rings engaged with at least a portion of the lock body to define the second bounded area.
Figure 25:
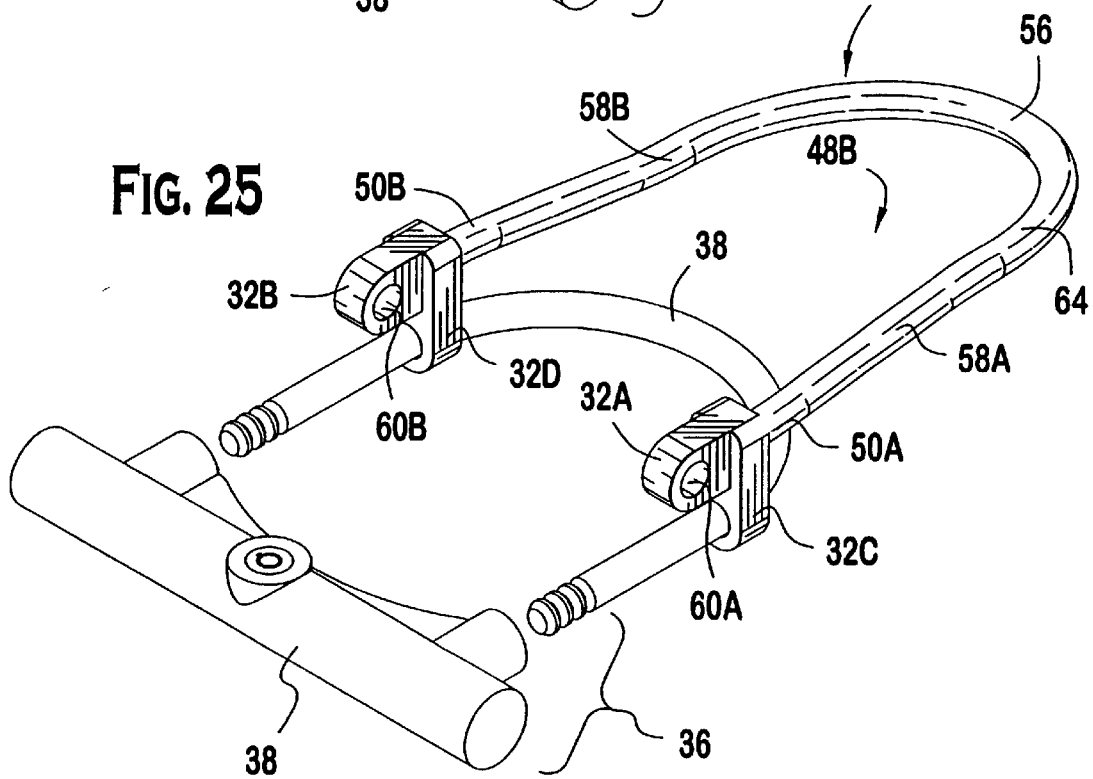
FIG. 25 is perspective view of the accessory component of FIG. 24 with the accessory component engaged with at least a portion of the lock body via third and fourth rings.
Figure 26:
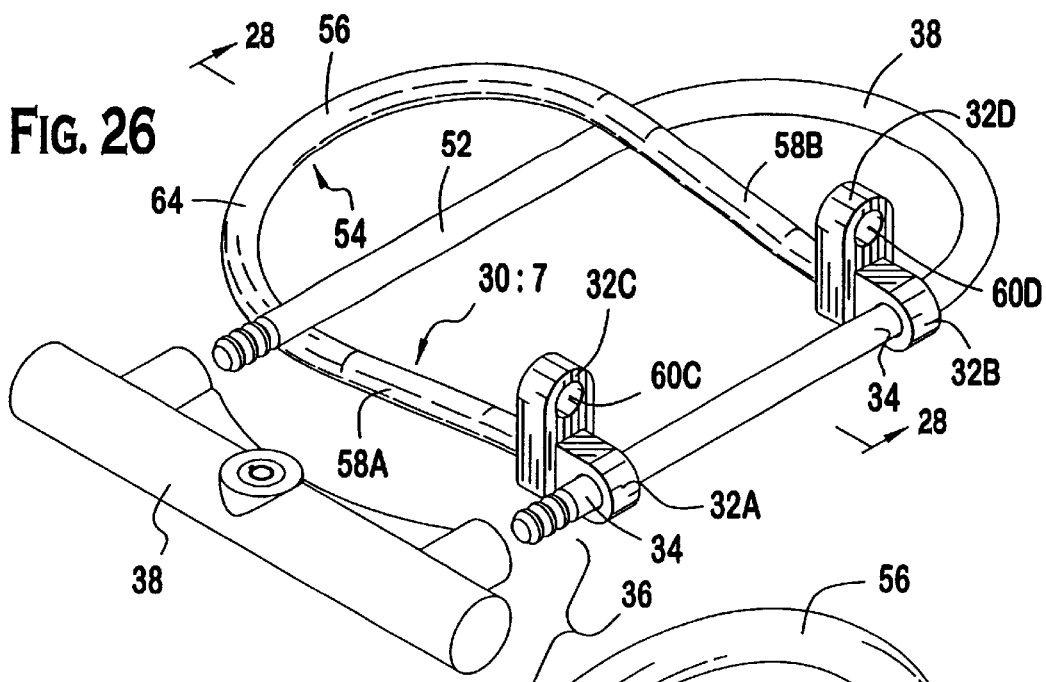
FIG. 26 is a perspective view of the accessory component of FIG. 24 illustrating the twist defined by the accessory component configuration bounding a second portion of the lock body, that is parallel to and spaced from the at least a portion of the lock body extending through the first and second rings, to facilitate the transportation and storage of the accessory component.
Figure 27:
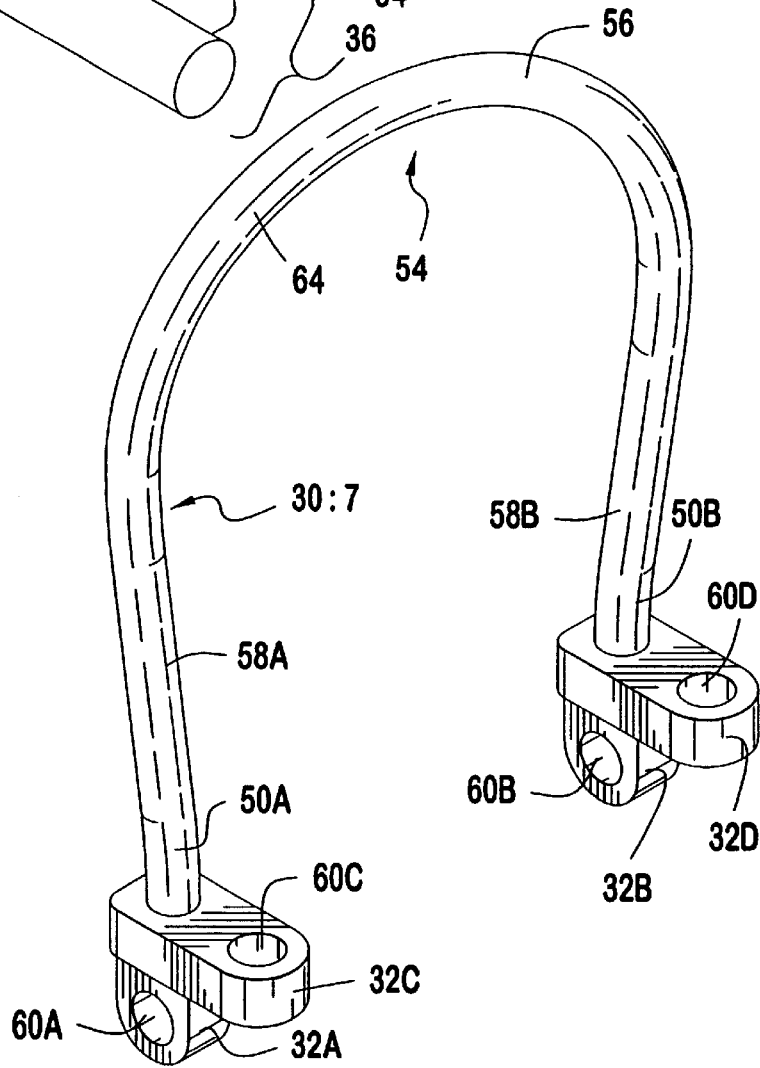
FIG. 27 is a perspective view of the accessory component of FIG. 24.

Referring to FIGS. 2, 9, and 14, it is preferred that the first bore 60A has a first central bore axis 62A therethrough and that the second bore 60B has a second central bore axis 62B therethrough. It is also preferred that the first and second rings 32A, 32B are configured to generally linearly align the first and second bore axes 62A, 62B. Those of ordinary skill in the art will appreciate from this disclosure that the first and second central bore axes 62A, 62B can be askew by up to approximately thirty (30) degrees while still being considered generally linearly aligned.

Referring to FIG. 6, it is alternatively preferred that the first and second rings 32A, 32B are configured to align the first and second bore axes 62A, 62B in a generally parallel fashion. This allows the accessory component 30:2 to be attached over the upper end of the lock 36 as shown in FIG. 5. This allows the accessory component 30:2 to linearly increase the distance over which the lock 36 can be used. Those of ordinary skill in the art will appreciate from this disclosure that the first and second central bore axes 62A, 62B can be askew by up to approximately thirty (30) degrees while still being considered generally parallel.

Referring to FIGS. 1, 4, 5, 8, 11, 12, 16, 20, 24, and 26, the accessory component 30:1–30:7 is adapted to be positionable in an installed configuration in which the at least a portion 34 of the lock body 38 is located within the first and second bores 60A, 60B such that the accessory component 30:1–30:7, in combination with the lock body 38, defines a second bounded area 48B. Referring to FIGS. 4, 4A, 4B, and 23, the second bounded are 48B can be used to enclose an object 40, such as a lamp post, bicycle rack, sign post, or the like to allow the securing of a bicycle or other possession to the object 40 to which the lock 36 alone would not be able to attach.

Figure 4A:
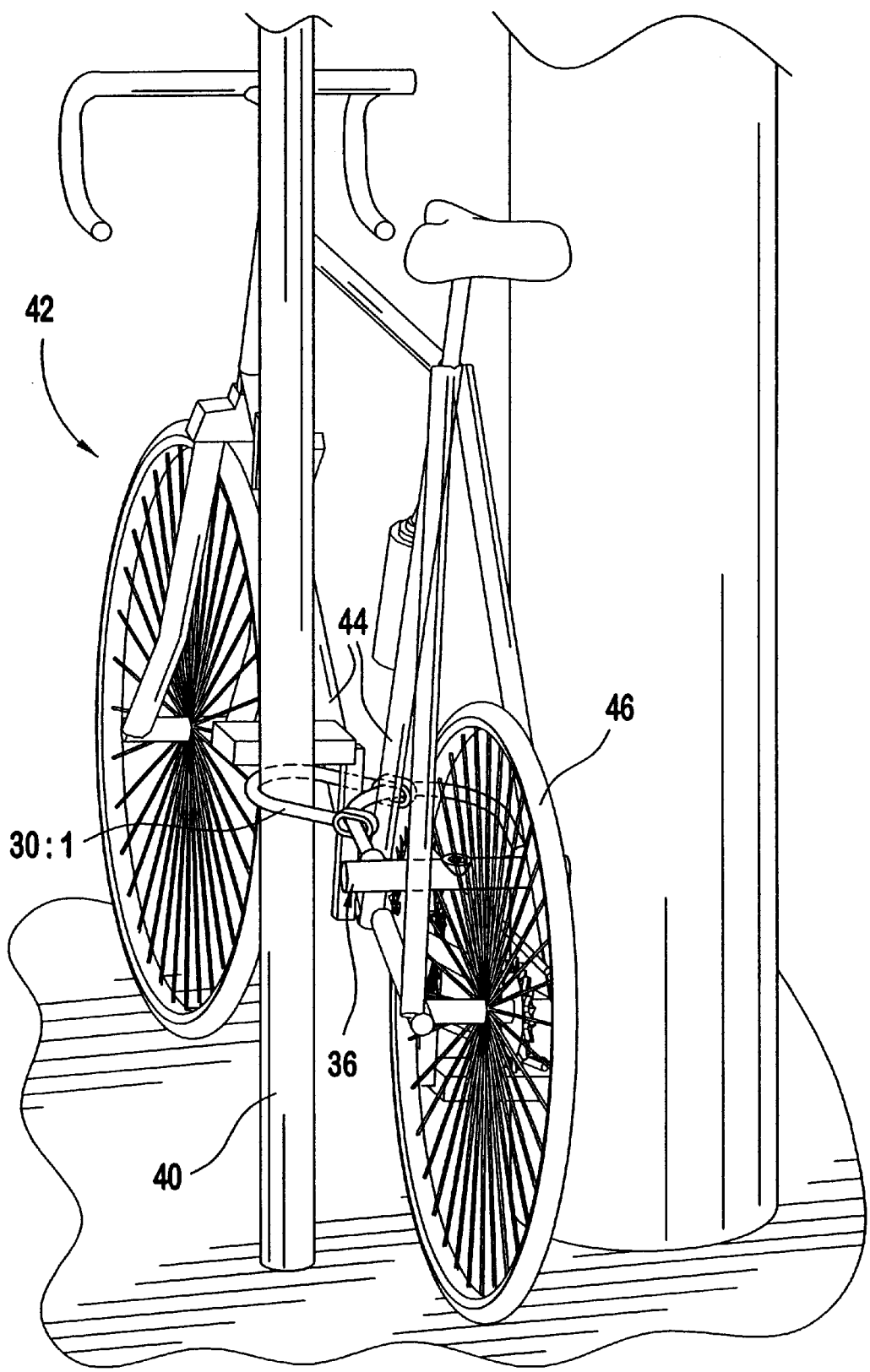
FIG. 4A is a perspective view of a lock detachably secured through a bicycle to define a first bounded area enclosing a portion of the bicycle frame and the rear tire of the bicycle. The accessory component of the present invention is installed on the lock to define a second bounded area enclosing a signpost.
Figure 4B:
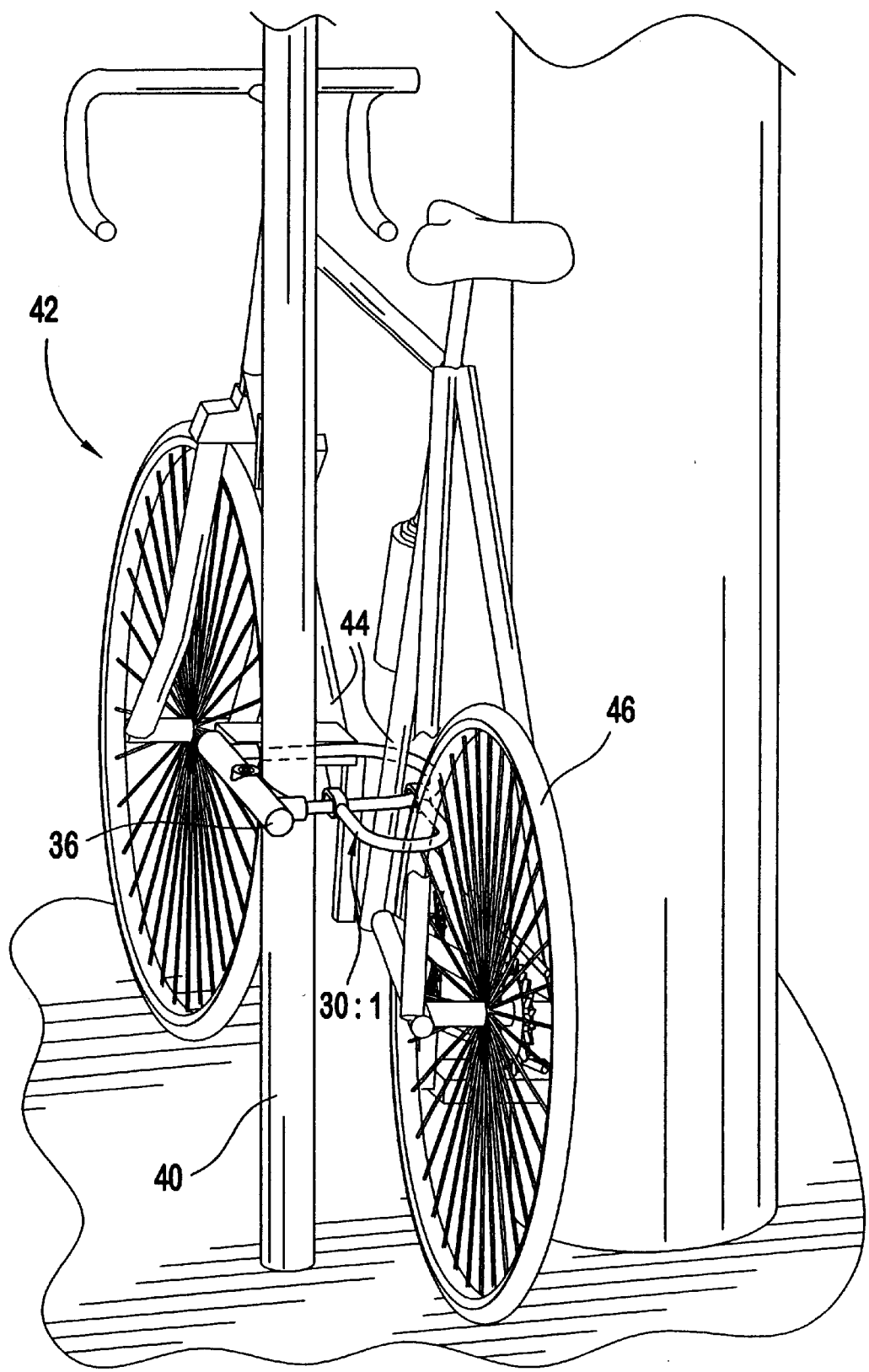
FIG. 4B is a perspective view of a lock detachably secured through a bicycle to define a first bounded area enclosing a portion of the bicycle frame and the signpost. The accessory component of the present invention is installed on the lock to define a second bounded area enclosing the rear tire of the bicycle.

Referring specifically to FIGS. 4 and 4A, the lock 36 would not normally be capable of securing the bicycle frame 44 and the rear tire 46 to the object 40 due to the relatively small size of the lock 36. However, the accessory component 30:1, in combination with the lock body 38, defines a second bounded area 48B in which the object 40 is secured to prevent the removal of the bicycle 42 or the rear tire 46 thereof. This allows lock 36 to be reduced in size even further than that shown in FIG. 4 such that the lateral width of lock 36 is generally equal to the lateral width of the greater of the rear tire 46 and the frame 44 as viewed in FIG. 4. Referring to FIG. 4B, the accessory component 30:1 can be used to secure a rear tire 46 of a bicycle 42 by attaching the accessory component 30:1 to a lock 36 securing the bicycle frame 44 to a signpost 40 or other object.

The accessory component 30:1–30:7 is adapted to secure the object 40 within the second bounded area 48B when the accessory component 30:1–30:7 is in the installed configuration and the lock 36 is detachably secured to form the closed loop 66.

Referring FIG. 12, it is preferred, but not necessary, that the lock 36 include a generally straight section 68. Referring to FIG. 13, it is also preferred, but not necessary, that the lock 36 include generally curved section 70.

Figure 28:
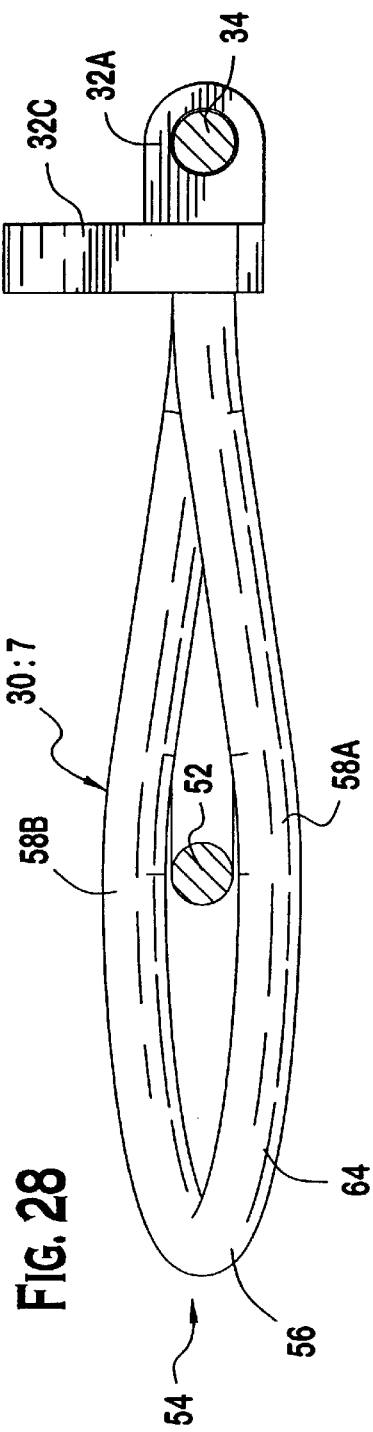
FIG. 28 is an elevational view of the accessory component of FIG. 24 illustrating at least a portion of the lock body within the first ring and also illustrating the second portion of the locked body bounded above and below by first and second component body legs.
Figure 29:
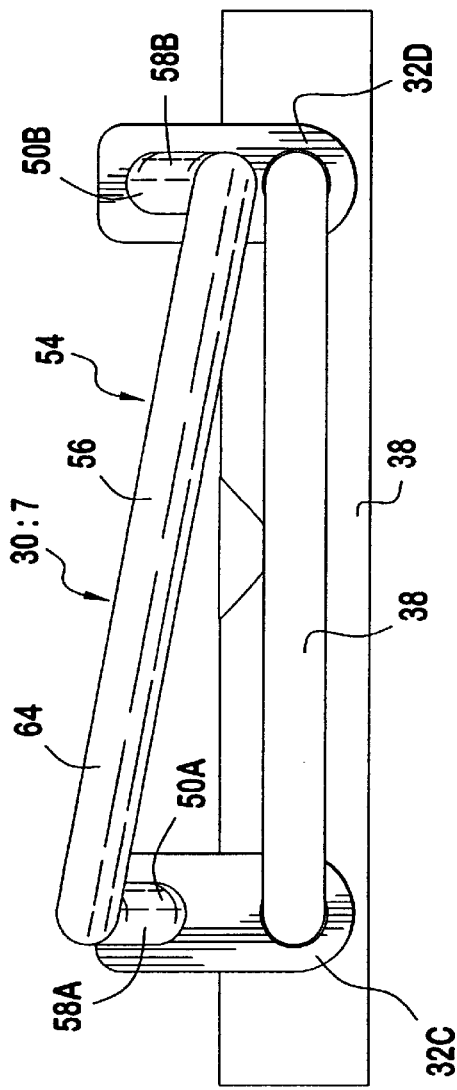
FIG. 29 is a plan view the combination accessory component and lock of FIG. 25.

Referring to FIGS. 8, 10, 26, and 28, it is preferred that the accessory component 30:1–30:7 include a component 64 having a portion that forms a component body end 56 and first and second component body legs 58A, 58B which extend from the component body end 56. While the illustrated component body end 56 has a generally curvilinearly shape, those of ordinary skill in the art will appreciate from this disclosure that the component body 64 can have a rectilinear, polygonal, or irregular shape without departing from the scope of the present invention. The component body end 56 is located generally opposite from the first and second rings 32A, 32B. The component body 64 is configured to define a twist 54 such that the component body 64 is adapted to receive a second portion 52 of the lock body 38. The second portion 52 of the lock body 38 is preferably oriented generally parallel to the first central bore axis 62A and is spaced from the at least a portion 34 of the lock body 38 which is adapted to be located within the first and second bores 60A, 60B. Alternatively, the second portion 52 of the lock body 38 is generally parallel to and spaced from the at least a portion 34 of the lock body 38 that is located within either one of the first and second rings 32A, 32B of the accessory component 30:1–30:7. Those of ordinary skill in the art will appreciate from this disclosure that the second portion 52 of the lock body 38 is considered to be generally parallel to either the first central bore axis 62A or the at least a portion 34 of the lock body 38 when the second portion 52 of the lock 38 is within approximately thirty (30) degrees of parallel. The twist 54 allows the second portion 52 of the lock body 38 to extend through the accessory component 30:3, 30:7 (as well as through the bounded area 48B) with the second portion 52 of the lock body 38 being bordered on at least two sides (e.g., the upper and low sides as shown in FIGS. 10 and 28) by the component body end 56 and the first and second component body legs 58A, 58B.

Referring to FIGS. 12–29, the accessory component 30:4–30:7 preferably includes a third ring 32C disposed on the first end 58A of the component body 64 and defining a third bore 60C. It is also preferred that a fourth ring 32D is dispose on the second end and 50B of the component body 64 and defines a fourth bore 60D. While the third and fourth rings 32C, 32D are preferably shown as being generally equally sized and shaped, those of ordinary skill in the art will appreciate from the disclosure that any of the rings 32A–32D can have different shapes and sizes without departing from the scope of the present.

Referring to FIGS. 12–14, it is preferred that the third bore 60C has a third central bore axis 62C therethrough and that a fourth bore 60D has a fourth central bore axis 62D therethrough. The third and fourth rings 32C, 32D are preferably configured to align the third and fourth central bore axes 62C, 62D in a generally parallel fashion. Those of ordinary skill in the art will appreciate from this that the third and fourth central bore axes 62C, 62D can be askew by up to approximately thirty (30) degrees while still being considered generally parallel.

Referring to FIG. 14, it is preferred that the first and third rings 32A, 32C are preferably configured such that the first and third central bore axes 62A, 62C are generally perpendicular. It is also preferred that the second and fourth rings 32B, 32D are configured such that the second and fourth central bore axes 62B, 62D are generally perpendicular. When the first through fourth rings 32A–32D are configured as shown in FIG. 14, the accessory component 30:4–30:7 has increased adjustability with regards to how the accessory component 30:4–30:7 is secured to the lock 36 as shown in FIGS. 16 and 17.

Figure 3:
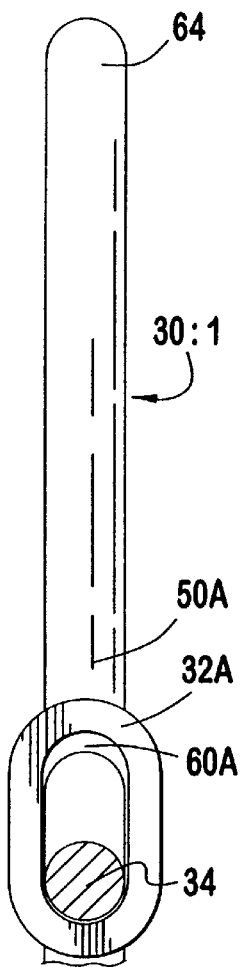
FIG. 3 is an elevational side view of the accessory component of FIG. 1 illustrating the at least a portion of the lock body in cross-section.

Referring to FIGS. 1–4, the first preferred accessory component 30:1 has a generally U-shape with first and second rings 32A, 32B having a generally elongated, oblong shape which results in the first and second bores 60A, 60B having a generally elongated slot like shape. The elongated slot shape of the first and second bores 60A, 60B increases the number of locks 36 that can be used with the accessory component 30:1. Referring particularly to FIG. 3, while the lateral width of the first bore 60A is shown as being complementary to the width of the portion 34 of the lock body 38, those of ordinary skill in the art will appreciate from this disclosure that the width of the first bore 60A can be significantly wider than the portion 34 of the lock body 38 to allow an increased number of locks 36 to be used with the accessory component 30:1. In a similar fashion, all of the bores 60A–60D illustrated with the accessory component 30:1–30:7 can be larger than those shown in the drawings to allow a greater variety of locks 36 to be used with the accessory component 30:1–30:7. In those instances in the drawings where the bores 60A–60D are illustrated as precisely complementing the shape of the lock body 38, those of ordinary skill in the art will appreciate from this disclosure that the precise complimentary fit between the accessory component 30:1–30:7 and the lock body 38 is preferred, but not necessary for the present invention.

Referring to FIGS. 5–7, the second embodiment of the accessory component 30:2 has first and second rings 32A, 32B that are oriented generally perpendicularly to the first and second ends 50A, 50B of the accessory component 30:2. This allows the accessory component 30:2 to be attached to the lock body 38 so as to increase the distance between one end of the lock 36 and the curved portion of the accessory component 30:2.

Referring to FIGS. 8–11 the third embodiment of the accessory component 30:3 has a twist 54 to allow the accessory component to be positioned with the second portion 52 of the lock 36 extending between the first and second legs 58A, 58B to facilitate the mounting of the lock system (the lock system includes the lock 36 and the accessory component 30:3) to a bicycle or similar vehicle with minimal rattling of the accessory component 30:3 during travel.

Referring to FIGS. 12–15, the fourth preferred embodiment of the accessory component 30:4 includes two pairs of rings on each of the first and second ends 50A, 50B of the accessory component 30:4 to increase the positions in which the accessory component 30:4 can be mounted to the lock 36. Referring to FIGS. 16–19, the fifth preferred embodiment of the accessory component 30:5 includes a pair of rings on each of the first and second ends 50A, 50B of the component body 64. The first and second rings 32A, 32B of the accessory component include elongated first and second bores 60A, 60B.

Referring to FIGS. 20–23, the sixth preferred embodiment of the assembly component 30:6 includes a pair of rings on each of the first and second ends 50A, 50B of an irregularly shaped component body 64. Referring to FIGS. 24–29, the seventh preferred embodiment of the assembly component 30:7 is similar to the sixth preferred embodiment except for the addition of a twist 54 in the component body 64 of the accessory component 30:7.

The present invention also includes a method of securing a first object (such as the bicycle frame 44 shown in FIG. 4) to a second object 40. The method includes providing a lock 36 having a lock body 38. The method includes providing an accessory component 30:1–30:7 having a component body 64 having first and second ends 50A, 50B. The first end 50A include first ring 32A defining a first bore 60A. The second end 50B includes a second ring 32B defining a second bore 60B. The method includes positioning the lock 36 around and/or through at least a portion of the first object and positioning the accessory component around and/or through at least a portion of the second object 40. The method includes inserting a portion of the lock 36 through the first and second bores 32A, 32B and detachably securing the lock 36 in a closed loop 66 to define a bounded area 48B securing at least a portion of the first object (such as the bicycle frame 44) therein, wherein the accessory component 30:1–30:7, in combination with the lock 36, defines a second a bounded area 48B securing at least a portion of the second object 40 therein.

It is preferred, but not necessary, that the method of the present invention include providing an accessory component 30:4–30:7 having third and fourth rings 32C, 32D. The third ring 32C is preferably disposed on the first end 50A of the component body 64 and defines a third bore 60C. The fourth ring 32D is preferably disposed on the second end 50B of the component body 64 and defines a fourth bore 60D.

Referring to FIG. 4, one embodiment of the present invention works as follows. The accessory component 30:1 is placed about an object 40 and a portion the lock body 38 is inserted through the first and second rings 32A, 32B. Then, the lock 36 is detachably closed in a loop that encloses a portion of a bicycle frame 44 (or other object) such that the bicycle frame 44 (or other object) is secured to the object 40 via the combination of the lock 36 and the accessory component 30:1.

While various shapes, configurations, ring positions and ring orientations have been described above in the various embodiments of the present invention 30:1–30:7, those of ordinary skill in art will appreciate from this disclosure that any combination of the above features can be used without departing from the scope of the present invention. For example, the first through fourth rings 32A, 32D can be oriented in any fashion when used with a flexible lock 36 without departing from the scope of the present invention. It is also recognized by those skill in the art, that changes may be made to the above described embodiments of the invention without departing from the broad inventive concept thereof. It is understood, therefore, that this invention is not limited to the particular embodiments disclosed, but is intended to cover all modifications which are within the spirit and scope of the invention as defined by the appended claims and/or shown in the attached drawings.

What is claimed is:

1. An accessory component for a lock having a lock body capable of being detachably secured in a closed loop to define a first bounded area, the accessory component comprising:

a component body having first and second ends, the first end including a first ring defining a first bore and the second end including a second ring defining a second bore, the first and second bores being adapted to receive at least a portion of the lock body therein, the accessory component being adapted to be positionable in an installed configuration in which the at least a portion of the lock body is located within the first and second bores such that the accessory component, in combination with the lock body, defines a second bounded area, wherein the accessory component is adapted to secure an object within the second bounded area when the accessory component is in the installed configuration and the lock is detachably secured to form the closed loop, the first bore has a first central bore axis therethrough and the second bore has a second central bore axis therethrough, the first and second rings being configured to generally linearly align the first and second central bore axes;

a third ring disposed on the first end of the component body and defining a third bore;

a fourth ring disposed on the second end of the component body and defining a fourth bore; and wherein the component body includes a portion forming a component body end and first and second component body legs extending from the component body end, the component body end being located generally opposite from the first and second rings, the component body being configured to define a twist such that the component body is adapted to receive a second portion of the lock body, that is oriented generally parallel to the first central bore axis and that is spaced from the at least a portion of the lock body adapted to be located within the first and second bores, therethrough with the second portion of the lock body being bordered on at least two sides by the component body end and the first and second component body legs.

2. The accessory component of claim 1, wherein the third bore has a third central bore axis therethrough and the fourth bore has a fourth central bore axis therethrough, the third and fourth rings being configured to align the third and fourth central bore axes in a generally parallel fashion.

3. The accessory component of claim 1, wherein the first and third rings are configured such that the first and third central bore axes are generally perpendicular, wherein the second and fourth rings are configured such that the second and fourth central bore axes are generally perpendicular.

4. The accessory component of claim 1, wherein the component body is generally U-shaped.

5. The accessory component of claim 1, wherein the component body is formed of a rigid material.

6. The accessory component of claim 5, wherein the component body is generally U-shaped.

7. A lock system, comprising:

a lock comprising a lock body capable of being detachably secured in a closed loop to define a first bounded area; and an accessory component comprising a component body having first and second ends, the first end including a first ring defining a first bore and the second end including a second ring defining a second bore, the first and second bores receiving at least a portion of the lock body therein, the accessory component being positionable in an installed configuration in which the at least a portion of the lock body is located within the first and second bores such that the accessory component, in combination with the lock body, defines a second bounded area, wherein the accessory component is adapted to secure an object within the second bounded area when the accessory component is in the installed configuration and the lock is detachably secured to form the closed loop wherein the first bore has a first central bore axis therethrough and the second bore has a second central bore axis therethrough, the first and second rings being configured to generally linearly align the first and second central bore axes wherein the component body includes a portion forming a component body end and first and second component body legs extending from the component body end, the component body end being located generally opposite from the first and second rings, the component body being configured to define a twist such that the component body receives a second portion of the lock body, that is generally parallel to the first central bore axis and that is spaced from the at least a portion of the lock body located within the first and second bores, therethrough with the second portion of the lock body being bordered on at least two sides by the component body end and the first and second component body legs.

8. The system of claim 7, wherein the lock includes a generally straight section disposed through the first and second bores.

9. The system of claim 7, wherein the lock includes a generally curved section disposed through the first and second bores.

10. The system of claim 7, further comprising:

a third ring disposed on the first end of the component body and defining a third bore; and a fourth ring disposed on the second end of the component body and defining a fourth bore.

11. The accessory component of claim 10, wherein the third bore has a third central bore axis therethrough and the fourth bore has a fourth central bore axis therethrough, the third and fourth rings being configured to align the third and fourth central bore axes in a generally parallel fashion.

12. The accessory component of claim 10, wherein the first and third rings are configured such that the first and third central bore axes are generally perpendicular, wherein the second and fourth rings are configured such that the second and fourth central bore axes are generally perpendicular.

13. The accessory component of claim 7, wherein the component body is generally U-shaped.

14. The accessory component of claim 7, wherein the component body is formed of a rigid material.

15. A lock system, comprising:

a lock comprising a lock body capable of being detachably secured in a closed loop to define a first bounded area;

an accessory component comprising a component body having first and second ends, the first end including a first ring defining a first bore and the second end including a second ring defining a second bore, the first and second bores receiving at least a portion of the lock body therein, the accessory component being positionable in an installed configuration in which the at least a portion of the lock body is located within the first and second bores such that the accessory component, in combination with the lock body, defines a second bounded area, wherein the accessory component is adapted to secure an object within the second bounded area when the accessory component is in the installed configuration and the lock is detachably secured to form the closed loop; and wherein the component body includes a portion forming a component body end and first and second component body legs extending from the component body end, the component body end being located generally opposite from the first and second rings, the component body being configured to define a twist such that the component body receives a second portion of the lock body, that is generally parallel to and spaced from the at least a portion of the lock body located within the first and second bores, therethrough with the second portion of the lock body being bordered on at least two sides by the component body end and the first and second component body legs.

16. An accessory component for a lock having a lock body capable of being detachably secured in a closed loop to define a first bounded area, the accessory component comprising:

a component body having first and second ends, the first end including a first ring defining a first bore and the second end including a second ring defining a second bore, the first and second bores being adapted to receive at least a portion of the lock body therein, the accessory component being adapted to be positionable in an installed configuration in which the at least a portion of the lock body is located within the first and second bores such that the accessory component, in combination with the lock body, defines a second bounded area, wherein the accessory component is adapted to secure an object within the second bounded area when the accessory component is in the installed configuration and the lock is detachably secured to form the closed loop; and wherein the component body includes a portion forming a component body end and first and second component body legs extending from the component body end, the component body end being located generally opposite from the first and second rings, the component body being configured to define a twist such that the component body is adapted to receive a second portion of the lock body, that is oriented generally parallel to and spaced from the at least a portion of the lock body when the at least a portion of the lock body is located within the first and second bores, therethrough with the second portion of the lock body being bordered on at least two sides by the component body end and the first and second component body legs.

* * * * *